US010172292B2

(12) United States Patent
Zador et al.

(10) Patent No.: US 10,172,292 B2
(45) Date of Patent: Jan. 8, 2019

(54) CUTTING DEVICE

(71) Applicant: Robert Bosch GmbH, Stuttgart (DE)

(72) Inventors: Endre Zador, Ipswich (GB); Janos Nagy, Mezönagymihály (HU); Krisztian Sepsi, Miskolc (HU); Mark Glanville, Ipswich (GB); Robert Soltesz, Miskolc (HU); Zoltan Zsoldos, Kispiac (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/295,201

(22) Filed: Oct. 17, 2016

(65) Prior Publication Data
US 2018/0103593 A1    Apr. 19, 2018

(51) Int. Cl.
*A01G 3/037* (2006.01)
*B26B 15/00* (2006.01)

(52) U.S. Cl.
CPC .............. *A01G 3/037* (2013.01); *B26B 15/00* (2013.01)

(58) Field of Classification Search
CPC .................................. A01G 3/037; B26B 5/00
USPC ............................................................ 30/254
See application file for complete search history.

(56) References Cited

U.S. PATENT DOCUMENTS

| | | | | |
|---|---|---|---|---|
| 1,587,718 A * | 6/1926 | Gentile | ................... | B26B 13/26 |
| | | | | 30/247 |
| 1,818,900 A * | 8/1931 | MacNamee | ............. | B26B 15/00 |
| | | | | 30/247 |
| 5,353,504 A * | 10/1994 | Pai | ........................... | B26B 15/00 |
| | | | | 30/194 |
| 6,367,156 B1 * | 4/2002 | Herrmann | ................. | B25B 7/12 |
| | | | | 30/228 |
| 2002/0116824 A1 * | 8/2002 | Herrmann | ................. | B25B 7/12 |
| | | | | 30/228 |
| 2008/0263872 A1 * | 10/2008 | Ferk | ......................... | B26B 15/00 |
| | | | | 30/228 |
| 2018/0103593 A1 * | 4/2018 | Zador | ...................... | B26B 15/00 |

FOREIGN PATENT DOCUMENTS

| | | | |
|---|---|---|---|
| CH | 259421 | * | 6/1949 |
| DE | 10 2010 016 296 A1 | | 10/2011 |
| DE | 102015206959 A1 | * | 10/2016 |
| DE | 102016211973 A1 | * | 1/2018 |
| DE | 102016211974 A1 | * | 1/2018 |

(Continued)

OTHER PUBLICATIONS

English translation of DE 102010016296, publication date: Oct. 2011.*

*Primary Examiner* — Hwei C Payer
(74) *Attorney, Agent, or Firm* — Maginot, Moore & Beck LLP

(57) ABSTRACT

A cutting device, such as a garden cutting device, includes a first and a second cutting element configured to move relative to each other, a first and a second gripping element configured to move relative to each other, at least one driving element, which in at least one operating state is configured to at least assist a movement of the second cutting element relative to the first cutting element, and a spring element. The spring element is configured as a brake element for switching of at least one self-switching coupling unit, thereby decoupling the driving element in at least one operating state in which the driving element is deactivated.

20 Claims, 15 Drawing Sheets

(56) References Cited

FOREIGN PATENT DOCUMENTS

| DE | 102016211975 A1 | * | 1/2018 |
| DE | 102016211976 A1 | * | 1/2018 |
| DE | 202016211978 A1 | * | 1/2018 |

* cited by examiner

Detail I

Detail II

IV - IV

IV - IV

V - V

VI - VI

Detail III

III" - III"

CUTTING DEVICE

BACKGROUND

A cutting device, such as a garden cutting device, has already been proposed.

From DE 10 2010 016 296 B4 there is already known a cutting device with two blades able to move relative to each other, with two gripping elements able to move relative to each other and with a driving element, which in one operating state is provided to assist a movement of the second blade relative to the first blade.

SUMMARY

A cutting device, such as a garden cutting device, is disclosed, with a first and a second cutting element able to move relative to each other, with a first and a second gripping element able to move relative to each other, and with at least one driving element, which in at least one operating state is provided to at least assist a movement of the second cutting element relative to the first cutting element. The cutting device comprises a spring element. The spring element can be designed as a brake element, as an opening spring, as a force sensor element, as a restoring element, as a compression or tension spring, as a spiral spring, as a tensioning spring, as a biasing spring or the like. It is proposed that the cutting device comprises at least one self-switching coupling unit, which is provided for a decoupling of the driving element in at least one operating state in which the driving element is deactivated.

Alternatively, another manual machine tool is also disclosed, with a first and a second working element able to move relative to each other, such as a gripping or pliers element, with a first and a second gripping element able to move relative to each other, and with at least one driving element, which in at least one operating state is provided to at least assist a movement of the second working element relative to the first working element, wherein the manual machine tool comprises at least one self-switching coupling unit, which is provided for a decoupling of the driving element in at least one operating state in which the driving element is deactivated.

Moreover, it is proposed that the at least one self-switching coupling unit is provided, in at least one operating state, for a decoupling of the driving element to realize of a full manual operation.

Moreover, it is proposed that the at least one self-switching coupling unit is designed as a freewheel clutch.

Moreover, it is proposed that the at least one self-switching coupling unit comprises at least one clamping body.

Moreover, it is proposed that the at least one self-switching coupling unit comprises at least one cage accommodating the clamping body, and one brake element, which is provided for a braking of the cage in at least one operating state.

Moreover, a cable winch which can be driven by the driving element and at least one cable which is and/or can be wound at least partly on the cable winch is proposed, which is tensioned at least partly between the gripping elements.

Moreover, it is proposed that the at least one self-switching coupling unit is integrated at least partly in the at least one cable winch.

Moreover, a spring element connected to the cable winch is proposed, which is configured for example as a spiral spring and which is provided to tension the cable in at least one operating state.

Moreover, at least one gear unit is proposed, which is arranged in a first gripping element of the gripping elements.

Moreover, it is proposed that the driving element and the gear unit are spatially arranged between the cutting elements and the at least one self-switching coupling unit.

Moreover, it is proposed that the at least one gear unit comprises at least two gear stages, between which the at least one self-switching coupling unit is arranged.

Moreover, at least one force sensor is proposed, which is integrated in a second gripping element of the gripping elements.

Furthermore, a method is proposed for an operation of the cutting device, wherein the driving element is switched to a closing mechanism of the cutting device when a defined user force is surpassed.

Furthermore, a method step is proposed in which the driving element is automatically halted upon reaching an end position of the cutting device and is briefly driven to open the coupling unit opposite a driving direction.

Furthermore, it is proposed that the cutting device is designed to recognize an object between the gripping elements, in order to switch off the assistance mode.

Moreover, it is proposed that a sensor is arranged for the recognition of the object at the first or second gripping element, such as on the grip inside of the first or second gripping element that is opposite the other respective gripping element.

Moreover, it is proposed that a sensor, such as a force sensor and/or displacement sensor, is arranged on the first or second gripping element to detect the need for motion assistance so that the cutting device switches off the assistance mode at least when an object is arranged between the gripping elements.

Moreover, it is proposed that a force transmission element, for example connected firm against rotation to the second cutting element, is arranged between the second cutting element and the second gripping element, which stands in operative connection with the driving element and which is arranged for determining the movement assistance, for example, for determining a switching of the motion assistance on and off, being movable relative to the second gripping element.

Moreover, it is proposed that the relative movement is a swivel movement of the force transmission element relative to the second gripping element.

Moreover, it is proposed that the second gripping element comprises at least one relative movement limiting element.

Moreover, it is proposed that a sensor, such as a force sensor and/or displacement sensor, detects the relative movement.

Moreover, it is proposed that the sensor comprises a spring and a switch as well as an assistance mode adjustment element, which is arranged for example on a grip inside of the first or second gripping element.

Moreover, it is proposed that at least one of the gripping elements is configured at least on the grip insides to avoid pinching, for example, at least partly elastic, rounded, and/or beveled.

Furthermore, it is proposed that between a pivot connecting the gripping elements and an opening spring arranged between the gripping elements there is arranged a protection device between the gripping elements.

Moreover, it is proposed that the protection device receives a cable of the cutting device, for example a power supply cable or sensor cable and/or forms a blocking device for blocking an intermediate space which is bounded by the gripping elements, the pivot and the opening spring, for example in order to avoid at least an accidental catching of part of a user's body in the intermediate space.

Furthermore, a cutting device, such as a garden cutting device, with a first and a second cutting element able to move relative to each other, with a first and a second gripping element able to move relative to each other, with an opening spring arranged between the gripping elements, with at least one driving element, which in at least one operating state is provided to at least assist a movement of the second cutting element relative to the first cutting element and with at least one driving force transmission element, which stands in operative connection with the driving element at least in the one operating state.

It is proposed that the driving force transmission element is arranged inside the opening spring.

Moreover, it is proposed that the driving force transmission element is a cable.

Moreover, it is proposed that the cable is made of polyethylene, such as polyethylene with ultrahigh molar mass.

Moreover, it is proposed that there is arranged a guide element, such as a guide sleeve, at least on one of the gripping elements, in order to guide the driving force transmission element with low friction and/or low wear.

Moreover, it is proposed that the opening spring comprises at least one guide element, in order to guide the driving force transmission element with low friction.

Moreover, it is proposed that the driving force transmission element is arranged without contact inside the opening spring.

Moreover, it is proposed that the opening spring is an evolute spring, such as a double evolute spring.

Moreover, it is proposed that the opening spring is configured such that it seals off the cavity formed by it, for example against dust and/or moisture.

Moreover, it is proposed that the ends of the opening spring are arranged in recesses of the gripping elements.

Moreover, it is proposed that the cutting device enables a manual as well as a manual-machine assisted operation.

Furthermore, it is proposed that the cutting device on or in the first gripping element the driving element, the gear unit, the coupling unit, the restoring unit and the driving element of the driving force transmission element are arranged in this sequence, with no further gearing located between the coupling unit and the driving element.

Moreover, it is proposed that the driving element connects, firm against rotation, at least one rotating component of the coupling unit and/or restoring unit, for example connects an inner rotary element of the coupling unit and a rotary body of the restoring unit firm against rotation.

Moreover, it is proposed that an inner rotary element of the coupling unit and a rotary body of the restoring unit are joined together at least frictionally or by form fitting, firm against rotation.

Moreover, it is proposed that an inner rotary element of the coupling unit is made of metal and a rotary body of the restoring unit is made of plastic.

Moreover, it is proposed that the driving element is connected by form fit via a polygonal profile to the coupling unit and/or the restoring unit.

Moreover, it is proposed that the restoring unit and the coupling unit are at least partly accommodated in a common housing.

Moreover, it is proposed that a securing element through a cage to accommodate clamping bodies of the coupling unit secures the coupling unit and the restoring unit on the housing.

Moreover, it is proposed that a planet carrier of the gear unit is part of the coupling unit, for example, an outer rotary element of the coupling unit.

Moreover, an assembly method is proposed at least for the assembly of a pretensioned restoring unit for the cutting device, wherein the restoring unit comprises a spring element connected firmly to a housing and a rotary body, and at least one part of a self-switching coupling unit, such as at least one inner rotary element, a cage for accommodation of clamping bodies, and a brake element, with at least the following steps of the method:

fixation of the restoring unit via a securing element on the housing of the coupling unit, pretensioning of the spring element by turning of the rotary body, temporary arrangement of an assembly jig fixing the housing with the rotary body firmly against rotation, for example, between the housing and the inner rotary element.

Moreover, an assembly method is proposed, with at least the following additional steps of the method:

connecting of the pretensioned restoring unit to a driving force transmission element of the cutting device, removal of the assembly jig to transmit the pretensioning force of the pretensioned restoring unit to the driving force transmission element, for example, for the pretensioning of the driving force transmission element with a restoring force.

Moreover, an assembly method is proposed, with at least the first of the following additional steps of the method:

rotary connecting and axial securing of an outer rotary element of the coupling unit via a connection element to an inner rotary element of the coupling unit, connecting of the outer rotary element, designed as a planet carrier, to a gear unit.

Furthermore, a blocking device is proposed for a battery-operated manual machine tool, for example, for a battery-operated cutting device, such as a pair of garden shears, with a first and a second cutting element able to move relatively to each other, wherein the blocking device in a first position, in which the blocking device blocks an activation and/or tool movement of the manual machine tool, releases a charging interface and in a second position, in which the blocking device releases an activation and/or tool movement of the manual machine tool, it blocks and/or covers the charging interface.

Moreover, it is proposed that the blocking device is designed as a mechanical blocking device.

Moreover, it is proposed that the blocking device has a sliding switch, which either releases, or blocks and/or covers the charging interface.

Moreover, it is proposed that the blocking device comprises a detent element, which is designed to mechanically block or release a tool movement, such as a tool movement in the form of a relative movement of a first and a second cutting element of the manual machine tool relative to each other.

Moreover, it is proposed that the charging interface is designed at least as a USB charging interface.

Moreover, it is proposed that the blocking device in the second position is designed to keep away contaminants from the charging interface.

Proposed that the blocking device in the second position is designed to seal off the charging interface, for example, water and/or dust-tight.

Furthermore, a cutting device is proposed, such as a garden cutting device, comprising at least a first and a second cutting element able to swivel relative to each other about an axis of rotation, wherein the cutting elements are joined together by at least one connection element arranged along the axis of rotation. It is proposed that a control device is provided, which produces a defined pressing force $F_{an}$ of the cutting elements relative to each other in the direction of the axis of rotation, independently of the connection element, for example, independently of a clamping force of the connection element.

Moreover, it is proposed that the control device comprises a spacing element, which advantageously surrounds the connection element, for example in the form of a sleeve.

Moreover, it is proposed that a lengthwise dimension 1 of the spacing element in the direction of the axis of rotation corresponds at least to a sum of the width dimensions b, b of the two cutting elements along the axis of rotation.

Moreover, it is proposed that the control device comprises an elastic element, such as a spring element, preferably a corrugated spring, which applies a defined axial force $F_{ax}$ to the cutting elements relative to each other along the axis of rotation.

Moreover, it is proposed that the elastic element is arranged such that it is braced along the axis of rotation at least indirectly by the housing of the cutting device, such as by the grip housing of the gripping element, and/or at least indirectly by the spacing element.

Moreover, it is proposed that the elastic element is provided as a friction adjustment element for adjusting a frictional force between the cutting elements.

Moreover, it is proposed that the elastic element is designed as an overload protection element of the cutting device, in order to prevent, at least in regions, a plastic deformation of the cutting elements during operation of the cutting device or to enable at least in regions a gaping of the cutting elements during operation of the cutting device.

Moreover, it is proposed that the control device rotationally decouples at least the connection element relative to the cutting elements, for example, rotationally decouples it in twist-proof manner.

Moreover, it is proposed that the connection element can be screwed into an abutment of twist-proof design and/or is designed as a single piece with at least the spacing element.

Furthermore, a cutting element for a pair of garden shears is proposed, comprising a cutting blade with a mount for connection to a cutting element mount of the pair of garden shears, wherein the cutting element has an insert guide for inserting the cutting element into the cutting element mount of the pair of garden shears.

Moreover, it is proposed that the insert guide is fashioned as a slanting surface and/or a round surface, for example a slanting surface and/or a round surface which is designed to be not the same as a cleanly deburred edge.

Moreover, it is proposed that the slanting surface has an angle α of less than °, for example less than °, especially preferably of °, relative to a cutting surface of the cutting element.

Moreover, it is proposed that the insert guide extends at least substantially between one end of the cutting element facing away from a tip of the cutting element and a recess for the fixation of the cutting element at the cutting element mount.

Moreover, it is proposed that the insert guide is designed for at least indirect spreading of an elastic element arranged at the cutting element mount.

Moreover, it is proposed that the cutting element is an interchangeable cutting element for the pair of garden shears.

Moreover, it is proposed that the cutting element comprises at least one form-fitting element for connection, firm against rotation, to a lever of the pair of garden shears, which can be connected to a gripping element of the pair of garden shears Moreover, a cutting device is proposed, especially preferably a battery-operated pair of garden shears, with a first cutting element of this kind and a second cutting element of this kind.

This cutting device can comprise a control device, which produces a defined pressing force $F_{an}$ of the first cutting element and the second cutting element relative to each other, wherein the insert guide is provided at least for the spreading of the control device during a replacement of the cutting element.

Moreover, the cutting device can enable a manual as well as a manual-machine assisted operation.

Preferably, the cutting device is designed as a pair of shears, especially preferably as a pair of garden shears. Preferably, the two blades which can move relative to each other are mounted so as to be able to swivel relative to each other. By a "garden cutting device" is meant in this context, for example, a cutting device intended for use on plants. Preferably, it means for example a cutting device which is provided for a trimming of plants, hedges, shrubs, branches, and/or other objects appearing sensible to a skilled person. By a "cutting element" is meant in this context, for example, an element of the cutting device which is provided for a direct contacting with an object to be cut. Preferably, it means an element which is provided for a direct dividing of an object to be cut. Basically, it is conceivable that at least one of the cutting elements is of passive design, such as an anvil and/or a passive cutting edge. Preferably, however, at least one cutting element has an active cutting edge, such as a blade, which is provided for an active cutting. Moreover, in this context, by a "gripping element" is meant, for example, an element which forms at least part of a handle.

Preferably, it means an element which is grasped at least partly by a user during operation. Preferably, both gripping elements are grasped by a user during operation, for example, with the same hand. By "a movement of the second cutting element relative to the first cutting element is assisted" is meant in this context, for example, that the driving element generates a force which acts at least partly in a direction which is the same as that of the user's force. Preferably, it means that a manual force, which produces for example a closing movement of the cutting elements relative to each other, is assisted in at least one operating state by a force additionally generated by the driving element.

By a "self-switching coupling unit" is meant in this context for example a coupling unit which is activated free of external, for example electrical, switching signals, such as those of a control unit.

Preferably, it means a coupling unit which is activated free of explicit switching signals, such as those for a switching between coupling states. Preferably, it means for example a coupling unit which is activated on the basis of mechanical factors of influence. Especially preferably it means for example a coupling unit which is activated in dependence on at least one parameter of a drive and/or power takeoff side. The coupling unit can therefore be designed, for example, to be speed-activated, torque-activated, direction-activated and/or force-flow activated. Moreover, in this context by a "decoupling of the driving element" is meant, for example, a decoupling of the driving element from a closing mechanism of the cutting device.

Thanks to the design of the cutting device according to the disclosure, an advantageous decoupling of the driving element can be accomplished. In this way, for example, an advantageously easy manual operation of the cutting device is made possible. Moreover, a coupling unit can advantageously be provided which is activated advantageously free of electrical switching signals. In this way, for example, there is no need for a control unit for an actuating of the coupling unit. Preferably, in this way an especially reliable coupling unit can be provided. For example, a coupling unit can be provided which is designed to be activatable independently of a power supply.

By a "full manual operation" is meant in this context for example an operating state in which the cutting device is operated free of an assistance by the driving element. Preferably, it means an operating state in which the cutting device is operated exclusively through the active force of a user. Especially preferably it means an operating state in which the driving element is decoupled and therefore cannot be used for an assistance of the movement of the second cutting element relative to the first cutting element. To become. In this way, for example, an advantageously smooth manual operation of the cutting device is made possible. For example, in this way one can use the cutting device advantageously even without the driving element, such as when there is no power supply, and/or for easy cutting work.

By a "freewheel clutch" is meant in this context for example a self-switching coupling which is designed to be direction-activated and/or force-flow activated. Preferably, the freewheel clutch is at least direction-activated. Preferably, the freewheel clutch is designed to open and/or close depending on a direction of rotation, for example of a driving side and/or power takeoff side of the coupling unit, and/or depending on a direction of force acting on the freewheel clutch. In the case of a direction of acting force, for example, one can distinguish whether the force is acting from the driving side or from the power takeoff side on the freewheel clutch. Preferably, the freewheel clutch is designed to open or close the driving element in at least one operating state depending on a direction of rotation, for example of a driving and/or power takeoff side, and/or depending on a direction of force acting on the freewheel clutch. In this way, for example, an especially advantageous self-switching coupling unit can be provided. For example, in this way an advantageously smooth manual operation of the cutting device can be made possible. Preferably, in this way an especially reliable coupling unit can be provided.

By a "clamping body" is meant in this context for example an element of the coupling unit which in at least one operating state, for example in a closed state of the coupling unit, is designed to clamp between two rotary elements of the coupling unit which are mounted rotatably relative to each other. Preferably, the clamping body is connected in a clamped state to one rotary element by form fitting in one direction of rotation, and to the other rotary element by force fitting in the direction of rotation, such as by friction. Preferably, it means for example an element which is designed to couple together, firm against rotation, the rotary elements of the coupling unit depending on an operating state of the coupling unit or decouple the rotary elements of the coupling unit from each other in regard to a movement in the circumferential direction. Preferably, the clamping bodies are clamped in a closed state of the coupling unit between the rotary elements. Preferably, at least one of the rotary elements of the coupling unit comprises ramps, by which a radial spacing between the rotary elements is changed. If the clamping bodies are moved into a region with a slight radial spacing, the rampless rotary element is rotated along by means of friction. If the clamping bodies are moved into a region with a large radial spacing, no rotary entrainment of the rampless rotary element occurs, since the friction is not sufficient. Various clamping bodies which appear expedient to a skilled person are conceivable, but preferably the clamping bodies are at least partially cylindrical or at least partially spherical in shape. In this way, for example, an especially advantageous self-switching coupling unit can be provided.

For example, in this way an advantageous, for example a simple-design freewheel clutch can be provided. Preferably, in this way an especially reliable self-switching coupling unit can be provided.

Preferably, the coupling unit comprises several clamping bodies, which are received in the same cage. Preferably, the cage receives the clamping bodies in receiving areas separate from each other. Preferably, the brake element is provided in at least one operating state to increase the inertia of the cage. Preferably, the brake element is designed to hinder an unwanted turning of the cage. Especially preferably, the brake element is designed to prevent a rotation of the cage until a definite force is acting. Preferably, the brake element is spring loaded. For example, the brake element is pressed with a defined force against the cage. By "cage" is meant in this context for example an element of the coupling unit which is provided for a positioning and/or guidance of the at least one clamping body, for example, in the circumferential direction. Preferably, the cage is designed to space apart several clamping bodies in the circumferential direction and distribute them, for example uniformly about a periphery. Especially preferably, the cage is designed to guide several clamping bodies in the circumferential direction relative to each other. In this way, for example, an advantageously defined movement of the clamping bodies can be achieved. For example, with several clamping bodies it can be accomplished that the clamping bodies execute the same movement in the circumferential direction. Preferably a controlled clamping of the clamping bodies can be made possible.

Moreover, the brake element can prevent an unwanted movement of the at least one clamping body. For example, an unwanted clamping can be prevented in this way. Furthermore, one can in this way make sure that the clamping bodies are only turned upon action of a force of a form-fitting rotary element of the coupling unit. For example, the brake element can reliably achieve an opening of the coupling unit. Preferably, with the brake element one can make sure that the clamping bodies stand still during an opening movement of the coupling unit and thus allow an opening of the coupling unit.

Preferably the cable is firmly fixed to one gripping element and secured to the other gripping element via the cable winch. For example, a free length of the cable can be changed via the cable winch. Preferably the cable winch can be driven via the coupling unit by the driving element. Preferably the cable winch in at least one operating state can be separated via the coupling unit from the driving element. Especially preferably, the cable winch forms a power takeoff side of the coupling unit. By a "cable winch" is meant in this context for example a cable drum, such as a cylindrical cable drum, which in at least one operating state can be driven by a driving element. In this way, an advantageous action of the force of the driving element can be achieved. For example, in this way a simple design is made possible for assisting the motion of the second cutting element relative to the first cutting element. A user can thus be advantageously assisted by the driving element during a closing movement. Moreover, thanks to the action of the force of the driving element on the gripping elements an advantageously high torque can be provided. This, in turn, can keep the power of a driving element low.

Furthermore, it is proposed that the at least one cable is stretched between the gripping elements in a region between a grip region of the gripping elements and a pivot by which the gripping elements can swivel relative to each other. Preferably, the cable is stretched between the gripping elements near the pivot, for example closer than 10 cm, preferably closer than 8 cm to the pivot. By a "grip region" in this context is meant for example a region of the gripping elements in which the gripping elements are regularly grasped by a user. In this way, it can be advantageously prevented that a user will be disturbed by the cable. Furthermore, the cable can advantageously be embodied to be short. In this way, for example, a cable winch can advantageously be small in design. Moreover, a fast closing of the cutting device can be made possible with a low speed of the cable winch.

It is further proposed that the cutting device comprises at least one spring element connected to the cable winch, which is designed for example as a spiral spring and which is provided for a tensioning of the cable in at least one operating state. Preferably the spring element is intended to ensure a tensioning of the cable. Preferably the spring element is designed to apply a force to the cable winch, such as a force in the circumferential direction. Especially preferably, the spring element is designed to produce a tensile force on the cable via the cable winch. For example, the cable should be kept taut via the spring element. Preferably the spring element has a spring force which is less than the spring force of an opening spring. Thanks to the spring element, for example, even in a full manual operation a tensioning of the cable can be assured. Thus, advantageously, an unwanted knotting of the cable can be prevented. Furthermore, a winding of the cable without drive power can be assured.

By a "gear unit" is meant in this context for example a step-up gear unit with a transmission ratio larger than 2, preferably larger than 10 and especially preferably larger than 50. In this way, an advantageously compact design can be achieved. Moreover, in this way an especially advantageous weight distribution can be achieved. For example, a weight of the gear unit can be arranged directly in a region of one hand of a user. This, in turn, can achieve a good operating comfort. Moreover, in this way for example the look of traditional manual pair of garden shears can be at least resembled.

Preferably the force sensor is coupled to a grip region of the second gripping element. Especially preferably, the grip region is mounted movably to a base body of the second gripping element. Preferably the force sensor is designed to sense a force acting on the second gripping element, for example relative to the first gripping element. Preferably the force sensor can be adapted to detect both a precise force and only an exceeding of a limit force.

Moreover, a method is proposed for the operation of a cutting device. It is proposed that, upon exceeding a defined user force, the driving element is switched on for a closing mechanism of the cutting device. In this way, an advantageously comfortable cutting device can be provided. Moreover, for example, one can ensure that the driving element is switched on only for heavy cutting work. In this way, the energy consumption can be kept low.

By a "driving direction" is meant for example a direction of rotation of the driving element in which the driving element turns during a regular operation, for example, for an assisting of a cutting movement. In this way, a fast opening of the cutting device can advantageously be made possible. For example, an advantageously intuitive operation can be accomplished in this way. An opening of the coupling unit can reliably be made possible.

Alternatively it is proposed that, upon reaching an end position of the cutting device, the driving element is automatically deactivated and the coupling unit is spontaneously decoupled upon absence of a rotary movement of the driving element. In this way, a rapid opening of the cutting device can advantageously be made possible. For example, an advantageously intuitive operation can be accomplished in this way.

A blocking device for a battery-operated manual machine tool is disclosed, especially for a battery-operated cutting device. It is proposed that the blocking device in a first position, in which the blocking device blocks an activation and/or tool movement of the manual machine tool, releases a charging interface and in a second position, in which the blocking device releases an activation and/or tool movement of the manual machine tool, it blocks and/or covers the charging interface. Advantageously, in this way an activation of the manual machine tool in the charging state can be prevented. The potential for injury is minimized. The manual machine tool is more safe. An inadvertent separation of the charging cable is prevented. The danger of electric shock to a user of the manual machine tool upon accidental severing of the charging cable is minimized. The electronics and control system of the manual machine tool are protected, since a simultaneous operation and charging of the manual machine tool is prevented. Thus, the often miniaturized electronics cannot become overheated. Damage to the manual machine tool is avoided. The charging interface is protected against mechanical influences or effects, especially damage, during operation of the manual machine tool. Fouling and corrosion at and in the charging interface is prevented. The lifetime of the charging interface is increased.

Moreover it is proposed that the blocking device is designed as a mechanical blocking device. Advantageously, the blocking device can have a robust design in this way. The elements of the blocking device can be manufactured easily and cheaply. It is able to safely withstand operating forces and transport stress without becoming damaged.

Furthermore, it is proposed that the blocking device has a sliding switch, which either releases, or blocks and/or covers the charging interface. Advantageously, a sliding switch is easy to activate. It can be easily guided in the housing of the manual machine tool. It can be easily installed when the manual machine tool has a two-shell design. It allows a good grip and ergonomic use.

Furthermore, it is proposed that the blocking device comprises a detent element, which is designed to mechanically block or release a tool movement, in particular a tool movement in the form of a relative movement of two cutting blades of the manual machine tool relative to each other. A detent element advantageously affords a detachable form-fitting connection. It can be manufactured cheaply. It is sturdy.

Furthermore, it is proposed that the charging interface is designed at least as a USB charging interface. Advantageously, the manual machine tool can therefore be charged with any charging device, for example, that for mobile radio devices. The charging interface is compact and dependable and is widely used as the standard in the IT industry. It is also possible to charge with no problems through a USB charging interface in a vehicle or at least its cigarette lighter, making possible a mobile charging. Moreover, device data can be read out via the USB interface, especially during a charging process, a software update can be loaded, or a fault diagnostics can be performed for the manual machine tool.

Moreover it is proposed that the blocking device in the second position is provided to keep contaminants away from the charging interface. Furthermore, it is proposed that the blocking device seals off the charging interface in the second position, in particular in water-tight manner. Advantageously, in this way the charging interface is protected against a penetration of dirt or moisture during operation of the manual machine tool. Thus, the penetration of dirt or moisture especially into the electronic components of the manual machine tool is prevented in this way. An error-free operation or constant functionality of the manual machine tool is assured.

Furthermore, it is proposed that the battery-operated manual machine tool is a pair of garden shears, preferably a pair of garden shears which enables a pure manual as well as a manual-machine assisted operation. The cutting elements of the pair of garden shears in the unblocked state present a risk of injury to the user. This is heightened on account of the electromechanically activatable assistance. Furthermore, a battery-operated pair of garden shears, especially a pair of garden shears which is adapted for single-hand operation, should be as compact as possible. Thanks to the blocking device according to the disclosure, the charging interface can be compact and resistant to dirt and moisture. Thanks to the combination of the charging interface cover and the blocking of the activation and/or tool movement, the number of components can be kept small. A compact and weight-saving design of the manual machine tool is realized.

Moreover, it is disclosed that the cutting elements comprise through-boreholes in the direction of the axis of rotation, through which the connection element protrudes. The radial surfaces of the through-boreholes of the cutting elements form bearing surfaces, which are rotatably mounted in particular on a corresponding bearing surface of the control device, especially a sleeve radially enclosing the connection element, especially as a sliding bearing. By a "clamping force" is meant in particular an axial force generated by the connection element or a pretensioning force of the connection element. The connection element is in particular at least one screw and one screw nut.

By the "pressing force" is meant in particular a force by which the axial sliding surfaces of the cutting elements are pressed against each other at least in the region of the connection element. In dependence on the pressing force of the cutting elements, an activating force for the turning or swiveling of the cutting elements that is applied to the gripping elements must be greater or smaller.

Advantageously, thanks to the control device the problems with cutting devices of the prior art are solved. The pressing force or the pretensioning force can be preadjusted. Independently of the force applied by a user and/or the tightening torque of the connection element, the pressing force of the cutting elements is at least practically constant. The cutting result is improved. A gaping, especially a plastic deformation of the cutting elements, is prevented, and the durability of the cutting device is improved.

Furthermore, it is proposed that the control device comprises a spacing element, which advantageously surrounds the connection element, especially in the form of a sleeve. The spacing element can be designed as a single piece with the connection element. The spacing element can also form the connection element. The spacing element establishes the spacing, especially a minimum spacing, of two clamping force transmission elements of the connection element in the direction of the axis of rotation. The clamping force transmission elements are in particular the screw head and the screw nut of the screw which transmit a pretensioning force at least partly to the spacing element and/or at least indirectly to the axial surfaces of the cutting elements. This serves to accomplish a minimum spacing of the two cutting elements in the direction of the axis of rotation at least in the region of the connection element, advantageously in the connection or sliding region of the cutting blades. The spacing element can also space apart the cutting elements in the radial direction of the connection element. In this way, the connection cross section of the cutting elements and the connection element or the control device is increased. This, in turn, enables a greater toughness of the cutting device. A suitability of the pair of garden shears for transmitting larger forces especially during a force assistance mode can be realized.

Moreover, it is proposed that a lengthwise dimension of the spacing element in the direction of the axis of rotation corresponds to at least a sum of the widths of the two cutting elements along the axis of rotation, especially to at least a sum of the widths of the two cutting elements in the region of the recess of the cutting elements. In this way, independently of the clamping force of the connection element and/or the tightening torque of a connection screw, an at least minimum play can be guaranteed between the cutting elements, so that it is assured that the cutting device can be activated.

Furthermore, it is proposed that the control device comprises an elastic element, especially a spring element, which applies a defined axial force or clamping force along the axis of rotation to the cutting elements relative to each other. The elastic element is advantageously disposed at least so that it braces at least indirectly one of the cutting elements axially in regard to the spacing element. The elastic element can be designed as a friction adjustment element for adjusting a friction force between the cutting elements. Advantageously, in this way, a constant basic activating force can be established for the closing of the cutting device. Independently of a manufacturing width of the cutting blade within a tolerance band, the pressing force of the cutting elements relative to one another is always approximately constant. In this way, a replacement of the cutting element is possible without further adjusting of the clamping force of the screw. In the case of cutting elements of different size, different elastic elements with different spring stiffness can be used, depending on the cutting blade used, without having to change the connection element.

It is proposed that the elastic element is disposed such that it is braced along the axis of rotation at least indirectly by the housing of the cutting device, especially the grip housing and/or at least indirectly by the spacing element. Thanks to the bracing on the housing, the connection element and especially the connection and spacing elements can be removed, for example to replace a cutting element, while the elastic element continues to be securely accommodated in the cutting device. Furthermore, the cutting element to be removed or which is replaceable is also secured at least against falling out from the cutting device even without the connection element installed. Thus, in this way, the operating comfort of the cutting device can be further simplified, especially when replacing a cutting element. The abutment, especially the screw nut of the connection element, is preferably likewise received firm against twisting in the housing of the cutting device, especially the grip housing, in particular, by a hexagonal form-fitting element. In this way, the operating comfort can be further enhanced when removing the connection element, for example, to replace the cutting element.

Furthermore, it is proposed that the elastic element is provided as a friction adjustment element for adjusting a friction force between the cutting elements. Thus, for example, a gaping dimension can be made adjustable, for example in order to handle different materials to be cut, different cutting elements and/or different cutting purposes in simple manner with a single cutting device.

Furthermore, it is proposed that the elastic element is designed as an overload protection element of the cutting device, so as to prevent at least in regions a plastic deformation of the cutting elements during operation of the cutting device, or to make possible at least in regions a gaping of the cutting elements during the operation of the cutting device. Thanks to the elastic element, a threshold value is adjusted, as it were, after which the cutting element can elastically gape open. Thus, even when the cutting device is overloaded, for example by an attempt to cut a branch which is too thick or material which is too strong, no damage to the cutting device results. The elastic behavior and the desirable gaping when a certain criterion is surpassed thus protects the cutting device and likewise increases its service life.

Furthermore, it is proposed that the control device rotationally decouples the connection element from the cutting elements, in particular in a twist-proof manner. Thus, the operationally-required rotation or swiveling of the cutting elements advantageously does not cause any loosening or twisting of the connection element. For this, the control device and/or the connection element can provide at least one detent element for the rotational fixation of the control device and/or the connection element about the axis of rotation. For example, a detent element arranged on a washer serves as a twist-preventing element, interacting with a detent recess in the grip housing or a built-on part. Moreover, the connection element and/or the spacing element or a ring especially securing the elastic element can be mounted twist-proof in the grip housing.

Moreover it is proposed that the connection element can be screwed into the stationary cutting element and/or is fashioned in particular as a single piece with at least the spacing element.

Furthermore, it is proposed that the cutting device is in particular a pair of garden shears, especially preferably a battery-operated pair of garden shears which enables a manual as well as a manual-machine assisted operation.

It is proposed that the cutting element comprises an insert guide for introducing the cutting element into the cutting element mount of the pair of garden shears. The mount for connection to a cutting element mount of the pair of garden shears is advantageously designed as a borehole or recess. Through the recess, a connection element especially in the form of a screw and/or sleeve can be inserted for the fixation to the cutting element mount of the pair of garden shears. The connection element serves as a rotary bearing for the cutting element and forms with it a pivot. Advantageously, a changing of the cutting element can be simplified by the insert guide.

Moreover, it is proposed that the insert guide be fashioned as a slanting surface and/or a round surface, not like a pure deburred edge and/or round surface. By a pure deburred edge is meant, for example, a broken edge, especially an edge broken at an angle of 45°, in order to prevent injury when grabbing or grasping the cutting element. A pure deburred edge can also be a rounded edge. The sector lengths of the broken edge are substantially the same. On the contrary, the slanting surface according to the disclosure has a distinct difference regarding the length of the sectors of the beveled edges, especially in a ratio of at least 1:3. Thanks to the slanting surface, the cutting element is wedge-shaped in the region of the insert guide. The slanting surface serves advantageously for the spreading of the cutting element mount, especially the spring-loaded cutting element mount, when inserting or changing the cutting element.

Furthermore, it is proposed that the slanting surface has an angle of less than 30°, especially less than 15°, especially preferably 5° relative to a cutting surface of the cutting element. Advantageously, in this way a large spring force of the cutting element mount of the pair of garden shears can be overcome when introducing the cutting element. A thickness of the cutting element decreases between the mount and the end of the cutting element, especially from 3.5 mm also 2.7 mm.

Furthermore, it is proposed that the insert guide extends at least substantially between an end of the cutting element facing away from a tip of the cutting element and a recess for fixation of the cutting element on the cutting element mount. By "substantially" is meant in this context a region of more than 50%, especially more than 75%, especially preferably 85%. Advantageously, in this way one can achieve, on the one hand, an easy spreading of the cutting element mount of the pair of garden shears. Moreover, the region around the recess is not weakened. Furthermore, a sufficient bearing surface is preserved parallel to the cutting plane, which is braced at least axially along an axis of rotation against the other cutting element of the pair of garden shears, especially in addition against a lever of the cutting device.

Furthermore, it is proposed that the insert guide is designed for the at least indirect spreading of an elastic element arranged on the pair of garden shears. Advantageously, the elastic element can be spread by the insert guide with no further aids, merely with the manual force of a user when inserting the cutting element into the pair of garden shears. Thanks to the elastic element, in turn, further benefits can be achieved, such as an overload protection of the pair of garden shears, a securing of the cutting element against unintentional dropping of the cutting element out from the pair of garden shears during a replacement of the cutting element, or the like.

Furthermore, it is proposed that the cutting element is an interchangeable cutting element for the pair of garden shears. Advantageously, the cutting element can be replaced when the blade is worn, or different cutting blades can be used for example for the cutting of different materials and changed in easy manner.

Moreover, it is proposed that the cutting element comprises at least a form-fitting element for connection, firm against rotation, to a lever of the pair of garden shears, which can be connected to a gripping element of the pair of garden shears, the lever and the cutting element having a coaxial recess transverse to the cutting surface of the cutting element by which they can be located on a pivot of the pair of garden shears and are able to swivel. Advantageously, an operation of the pair of garden shears assisted by a driving force can be realized in this way. Moreover, the disposition of the lever can protect the fingers from being pinched. A good force transmission and a good interchangeability of the cutting element are improved in this way.

Furthermore, a cutting device is proposed, especially preferably a battery-operated pair of garden shears having a cutting element according to the disclosure.

Moreover, a cutting device is proposed which comprises a control device, producing a defined pressing force of the cutting element and an additional cutting element against each other, wherein the insert guide is provided for the spreading of the control device when replacing the cutting element. The control device preferably comprises the elastic element. In this way, an overload protection, a defined gaping, a simplified cutting element replacement or the like can be advantageously achieved.

Furthermore, a cutting device is proposed which enables a manual as well as a manual-machine assisted operation.

Cutting device, such as a garden cutting device, with a first and a second cutting element able to move relative to each other, with a first and a second gripping element able to move relative to each other, and with at least one driving element, which in at least one operating state is provided to at least assist a movement of the second cutting element relative to the first cutting element, and a spring element, characterized in that the spring element is designed as a tensioning element for the tensioning of a driving force transmission element driven by the driving element, such as one in the form of a cable, such as a cable which can be at least partly wound onto a cable winch.

Cutting device characterized in that the spring element is designed as a spiral spring, for example a spiral spring connected to a cable winch and/or accommodated in the cable winch.

Cutting device characterized by at least one gear unit, for example a multistage gear unit, such as one in the form of a multistage planet gear unit, wherein the gear unit is disposed in the first gripping element, for example between the driving element and the self-switching coupling unit.

Cutting device, such as a pair of garden shears or battery-operated pair of garden shears, characterized in that the cutting device enables a manual as well as a manual-machine assisted operation.

Cutting device, characterized in that the spring element is designed as an elastic element for generating a defined pressing force of the two cutting elements against each other in the direction of an axis of rotation of the cutting elements and independently of a clamping force ($F_{klemm}$) of a connection element of the two cutting elements.

Cutting device, characterized in that the cutting device comprises a blocking device, which in a first position, in which the blocking device blocks an activation and/or tool movement of the manual machine tool, releases a charging interface and in a second position in which the blocking device releases an activation and/or tool movement of the manual machine tool it blocks and/or covers the charging interface.

Cutting device, characterized in that the cutting device comprises a cutting element, having a cutting blade with a mount for connection to a cutting element mount of the cutting device, wherein the cutting element comprises an insert guide for introducing the cutting element into the cutting element mount of the pair of garden shears.

BRIEF DESCRIPTION OF THE DRAWINGS

Further benefits will emerge from the following drawing description. The drawings show a sample embodiment of the disclosure. The drawing, the description, and the claims contain numerous features in combination. The skilled person will also expediently consider the features individually and assemble them into further meaningful combinations.

There are shown.

DETAILED DESCRIPTION

Figure 1:
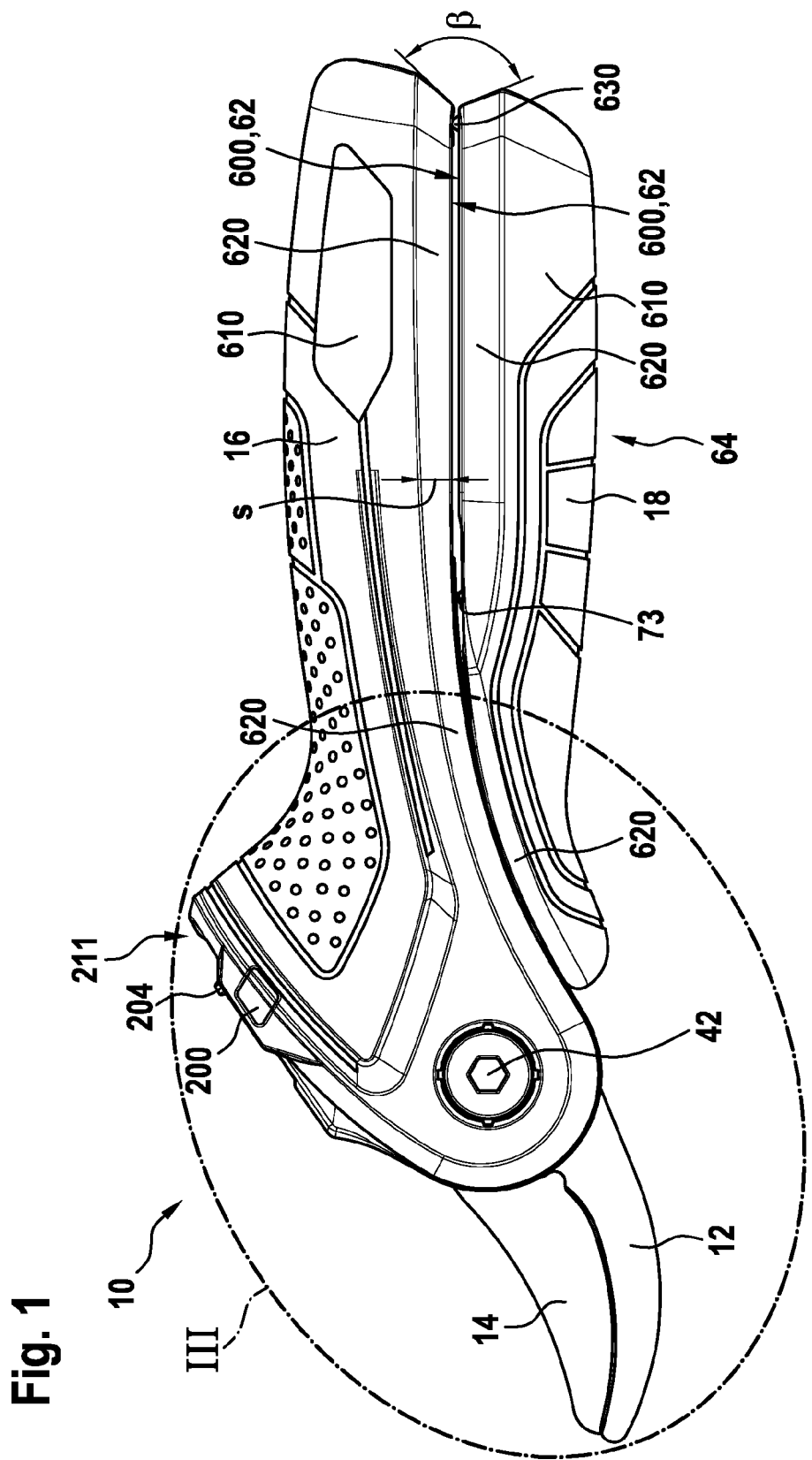
FIG. 1 shows a cutting device according to the disclosure with two cutting elements and two gripping elements in a closed state.

FIG. 1 shows a cutting device 10 according to the disclosure. The cutting device 10 is designed as a garden cutting device. The cutting device 10 is designed as a pair of garden shears. The cutting device is designed as a battery-operated cutting device 10. Basically, however, another design of the cutting device 10 would also be conceivable, such as a pair of carpet or sheet metal shears or the like.

Figure 2:
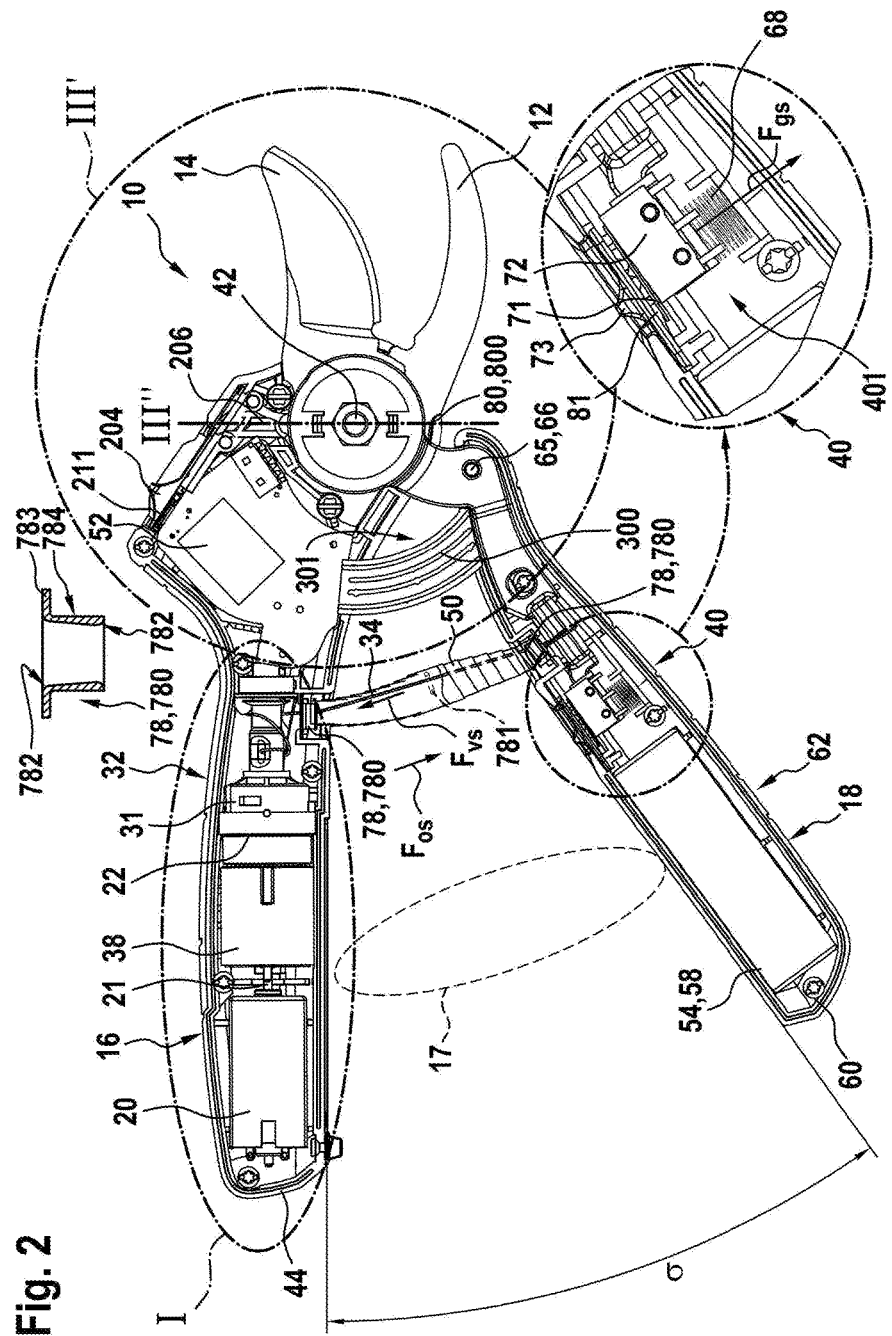
FIG. 2 shows the cutting device in an opened state, wherein a force assistance mode is deactivated, as well as an enlarged representation of a force sensor of the cutting device.

The cutting device 10 has two cutting elements 12, 14 able to move relative to each other (FIG. 2, 3). The cutting elements 12, 14 can swivel relative to each other. A first cutting element 12 is in this case designed as a passive blade with a cutting edge. The second cutting element 14 is designed as an active blade with a blade. Moreover, the cutting device 10 comprises two gripping elements 16, 18 able to move relative to each other. The gripping elements 16, 18 can swivel or rotate relative to each other. The gripping elements 16, 18 are able to swivel relative to each other by at least one pivot 42. The cutting elements 12, 14 are likewise able to swivel relative to each other by the pivot 42. The pivot 42 is disposed between the gripping elements 16, 18 and the cutting elements 12, 14. The first gripping element 16 and the first cutting element 12 are joined together and arranged on different sides of the pivot 42. Moreover, the second gripping element 18 and the second cutting element 14 are at least indirectly joined together and arranged on different sides of the pivot 42. A force transmission element 800, here in the form of a lever 80, connects the second cutting element 14 to the second gripping element 18. The gripping elements 16, 18 are designed to be grasped by a user. The gripping elements 16, 18 are designed to be grasped by a user with the same hand. Basically, however, it would also be conceivable for the cutting device 10 to be designed for a two-handed operation. For example, additional lever and or transmission elements could be provided in order to alter a cutting force $F_{cut}$ at least partly relative to the force applied to the gripping elements 16, 18, especially an operating force $F_{user}$.

Furthermore, between the gripping elements 16, 18 is arranged an opening spring 50. The opening spring 50 is arranged in regard to a lengthwise dimension of the gripping elements 16, 18 closer to the pivot 42 than to a free end of the gripping elements 16, 18. The opening spring 50 is designed as a compression spring. The ends of the opening spring 50 are braced against the first and second gripping element 16, 18. The opening spring 50 is designed to force apart the gripping elements 16, 18 and thereby open the cutting device 10. The opening spring 50 is moreover designed to receive and/or guide, in a cavity formed by the latter, a driving force transmission element 340, here in the form of a cable 34, standing in operative connection with a driving element 20, as further explained below.

Moreover, between the opening spring 50 and the pivot 42 is arranged a protection device 300. The protection device 300 extends between the two gripping elements 16, 18. The protection device 300 is advantageously connected firmly to the second gripping element 18. The protection device 300 moreover is movably mounted in the first gripping element 16. The protection device can be designed, for example, as a telescopic device or as a rigid device. The protection device 300 is provided to protect at least one cable (not shown) of the cutting device 10, which is led for example from the first into the second gripping element 16, 18, against external influences and/or to mount it securely between the first and second gripping element 16, 18. The cable for example is a cable for the electrical connection of an energy storage unit 54 and a control unit 52 and/or a driving element 20 or a sensor cable, which is led from a sensor 401 to the control unit 52. The protection device 300, however, also narrows an otherwise free intermediate space 301 between the pivot 42 and the opening spring 50 or fills it up at least partly, so that the user for example can only with difficulty stick his finger inadvertently into this intermediate space or a material being cut such as a twig or a branch can only with difficulty get caught in this intermediate space. Accordingly, the protection device 300 is also a blocking device for the intermediate space 301. In the intermediate space 301 between the pivot 42 and the opening spring 50 is especially a danger of pinching of an object 17, especially the fingers or skin of a user, since the forces operating in this area are high on account of the leverage or lever length of the gripping elements 16, 18 around the pivot 42. Thus, thanks to the protection device 300 a protected and secure leading of electronic region parts between the gripping elements 16, 18 is assured. Furthermore, the protection device 300 serves to prevent injury.

Moreover, the cutting device 10 comprises a driving element 20. The driving element 20 is designed as an electric motor. The electric motor is designed to be powered with a voltage less than 110 V, especially with a voltage of 1 V to 36 V, preferably 3.6 V. The driving element 20 is arranged in the first gripping element 16. The driving element 20 is arranged in a grip housing 44 of the gripping element 16. The driving element 20 is arranged at an end of the first gripping element 16 facing away from the cutting elements 12, 14. The grip housing 44 comprises two housing shells, in which the driving element 20 is firmly mounted. The driving element 20 is adapted in at least one operating state to assist a movement of the second cutting element 14 relative to the first cutting element 12. The driving element 20 is designed to assist a closing movement of the cutting device 10 executed by the gripping elements 16, 18 in the event of heavy cutting work. In this way, a force required of a user $F_{user}$ to activate the cutting device 10 can be reduced.

Figure 4:
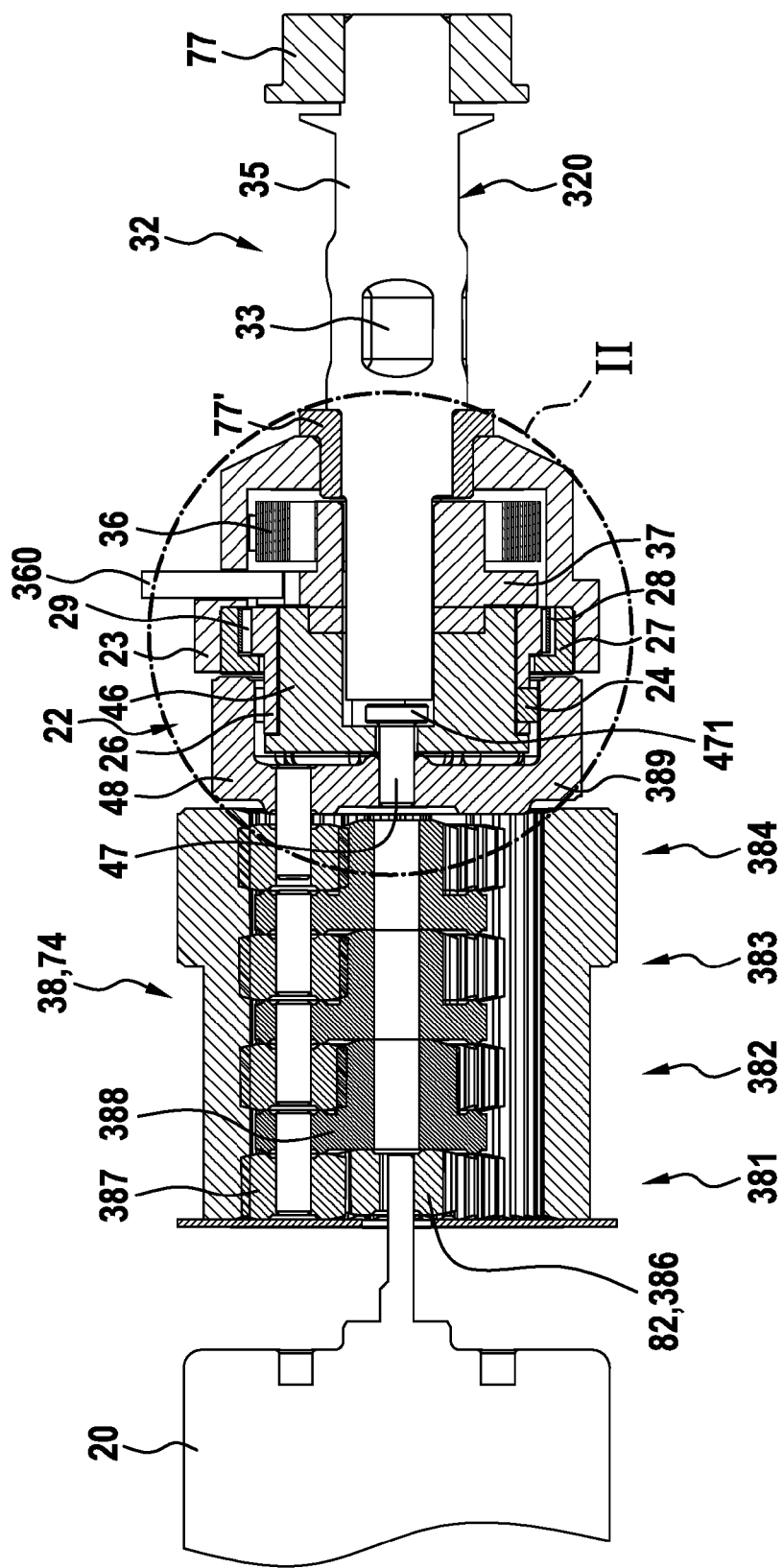
FIG. 4 shows the gear unit, the coupling unit, the restoring unit and the cable winch of the cutting device in a schematic sectional representation of Detail I.

Furthermore, the cutting device 10 comprises a gear unit 38. The gear unit 38 is arranged in the first gripping element 16. The gear unit 38 is arranged in the grip housing 44 of the gripping element 16. The gear unit 38 is arranged on a side of the driving element 20 facing the cutting elements 12, 14. The gear unit 38 in the present case is driven directly by the driving element 20. A force transmission from the driving element 20 to the gear unit 38 occurs via a power takeoff shaft 21 of the power takeoff unit 20 to a pinion 82 of the gear unit 38. The gear unit 38 is designed as a gear transmission unit. The gear unit 38 comprises at least one gear stage. The gear unit 38 advantageously comprises several gear stages. The gear unit 38 comprises in particular one to six gear stages, advantageously four gear stages. The at least one gear stage is designed as a planetary gear stage 381, 382, 383, 384. The gear unit 38 is designed as a planetary gear transmission unit (FIG. 4). The transmission ratio of the gear unit 38 is advantageously from 30:1 to 300:1, especially from 100:1 to 150:1, especially 130:1. Basically, however, another transmission ratio would also be conceivable. The gear unit 38 is mounted via a housing 74 of the gear unit 38 in the gripping element 16. The housing 74 of the gear unit 38 is formed by at least one ring gear 385 of the at least one planetary gear stage 381, 382, 383, 384. The housing 74 of the gear unit 38 can also be formed by individual serially arranged ring gears of the planetary gear stages 381, 382, 383, 384. The force transmission within the at least one planetary gear stage 381, 382, 383, 384 occurs each time from a driven sun wheel 386 via planets 387 of the respective planetary gear stage, which are braced against a stationary ring gear 381, to a planet carrier 388 revolving with the planets 387. The planet carrier 388 in turn drives a sun wheel of the next gear stage 382, 383, 384. The planet carrier 389 of the last gear stage 384 forms the power takeoff of the gear unit 38.

Figure 5:
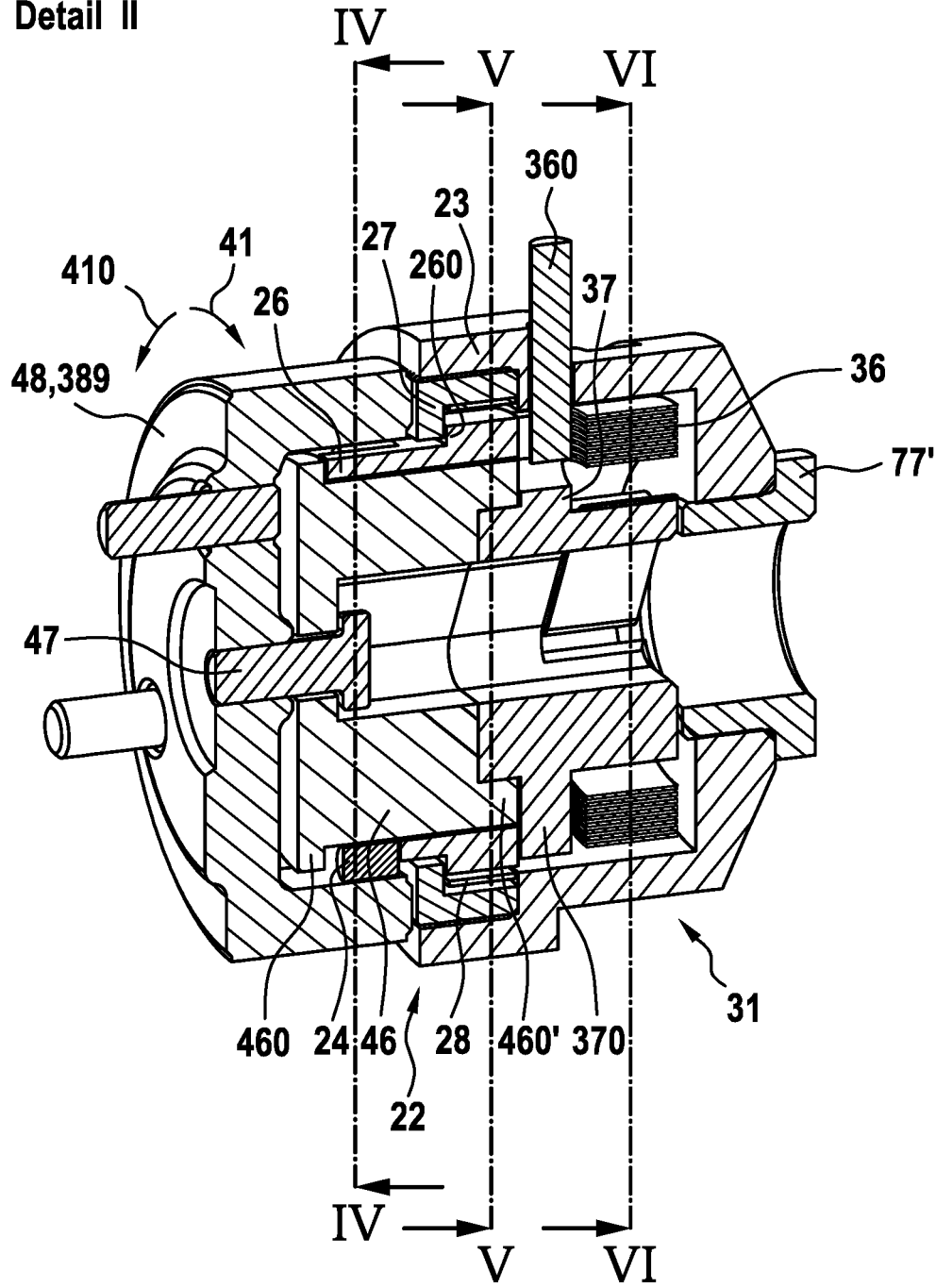
FIG. 5 shows the coupling unit and the restoring unit of the cutting device in a schematic sectional representation of Detail II.

The cutting device 10 moreover comprises a coupling unit 22 (FIGS. 4 and 5). The coupling unit 22 is designed as a self-switching coupling unit 22. By a "self-switching coupling unit" is meant in this context in particular a coupling unit 22 which is activated free of external, for example electrical, switching signals, especially those of a control unit 52. Preferably, it means a coupling unit 22 which is activated free of explicit switching signals, for a switching between coupling states. Preferably, it means a coupling unit 22 which is activated on the basis of mechanical factors of influence. Preferably it means a coupling unit 22 which is activated in dependence on at least one parameter of a driving and/or power takeoff side. The coupling unit 22 can therefore be designed, in particular, to be speed-activated, torque-activated, direction-activated and/or force-flow activated. The self-switching coupling unit 22 is designed as a freewheel clutch. By a "freewheel clutch" is meant in this context especially a self-switching coupling which is designed to be direction-activated and/or force-flow activated. Preferably, the freewheel clutch is at least direction-activated. Preferably, the freewheel clutch is designed to open and/or close depending on a direction of rotation, especially of a drive and/or power takeoff side of the coupling unit 22, and/or depending on a direction of force acting on the freewheel clutch. In the case of the direction of acting force, for example, one can distinguish whether the force is acting from the driving side or from the power takeoff side on the freewheel clutch. Preferably, the freewheel clutch is designed to open or close the driving element 20 in at least one operating state depending on a direction of rotation, especially of a driving and/or power takeoff side, and/or depending on a direction of force acting on the freewheel clutch. The coupling unit 22 is arranged in the first gripping element 16. The coupling unit 22 is arranged in the grip housing 44 of the first gripping element 16. The coupling unit 22 is designed to decouple the driving element 20 in at least one operating state in which the driving element 20 is deactivated. In particular, upon reaching an end position of the cutting device 10 and/or upon relaxing an operating force $F_{user}$ exerted on the gripping element 16, 18, the driving element 20 is automatically deactivated and the coupling unit 22 with no further rotary movement of the driving element 20 is automatically decoupled. By a "decoupling of the driving element" is meant in particular a decoupling of the driving element 20 from a closing mechanism of the cutting device 10. The coupling unit 22 is also designed to decouple the gear unit 38 in at least one operating state in which the driving element 20 is deactivated. The coupling unit 22 is designed to decouple the driving element 20 and/or the gear unit 38 at least to realize a full manual operation. By a "full manual operation" is meant in this context in particular an operating state in which the cutting device 10 is operated free of an assistance by the driving element 20. Preferably, it means an operating state in which the cutting device 10 is operated exclusively through the active force $F_{user}$ of a user. Especially preferably it means an operating state in which the driving element 20 is decoupled and therefore cannot be used for an assistance of a movement of the second cutting element 14 relative to the first cutting element 12. In this way, in particular, an advantageously smooth manual operation of the cutting device can be made possible. In particular, in this way one can use the cutting device 10 advantageously even without the driving element 20, such as when there is no power supply, and/or for easy cutting work. The coupling unit 22 is advantageously designed to accelerate the opening or spreading movement of the two cutting elements 12, 14 or the two gripping elements 16, 18. The coupling unit 22 enables an accelerated winding and/or unwinding of a driving force transmission element 340, here in the form of a cable 34, from a cable winch 32 or cable drum 320 of a cable winch 32, during an opening or spreading of the cutting device 10, as described further below. In this way, the speed of operation of the cutting device or the processing speed can be boosted and the operating comfort increased. The number of possible cuts per unit of time can be increased. After a previous closing process of the cutting device 10, during which at least the driving element 20 assists a movement of the second cutting element 14 relative to the first cutting element 12, the coupling unit 22 is designed to decouple the driving element 20 and again couple it with motorized force assistance during another closing movement.

The coupling unit 22 comprises an inner rotary element 46 and an outer rotary element 48. The inner rotary element 46 can turn in at least one state relative to the outer rotary element 48. The outer rotary element 48 is advantageously connected to the power takeoff of the gear unit 38. A portion of the coupling unit 22 advantageously forms a portion, especially of the last gear stage 384 of the gear unit 38. The outer rotary element 48 is advantageously formed as a single piece with the one portion of the gear unit 38, especially the planet carrier 389 of the last gear stage 384 and/or the power takeoff of the gear unit 38. The inner rotary element 46 and the outer rotary element 48 are secured against each other by means of a connection element 47, especially a coaxial one. The connection element 47 is designed as a connecting pin. The connection element 47 secures the inner and outer rotary element 46, 48 at least axially and/or radially to each other. The connection shaft 47 is preferably firmly, especially frictionally joined to the outer rotary element 48 and at least with rotary play to the inner rotary element 46. The connection shaft 47 is received in a slide-bearing manner on the inner rotary element 46. The connection shaft 47 moreover has a shoulder 471 for the axial securing of the inner rotary element 46 against the outer rotary element 48. The shoulder 471 is braced against a surface of the inner rotary element 46, especially a rimlike surface.

Figure 6:
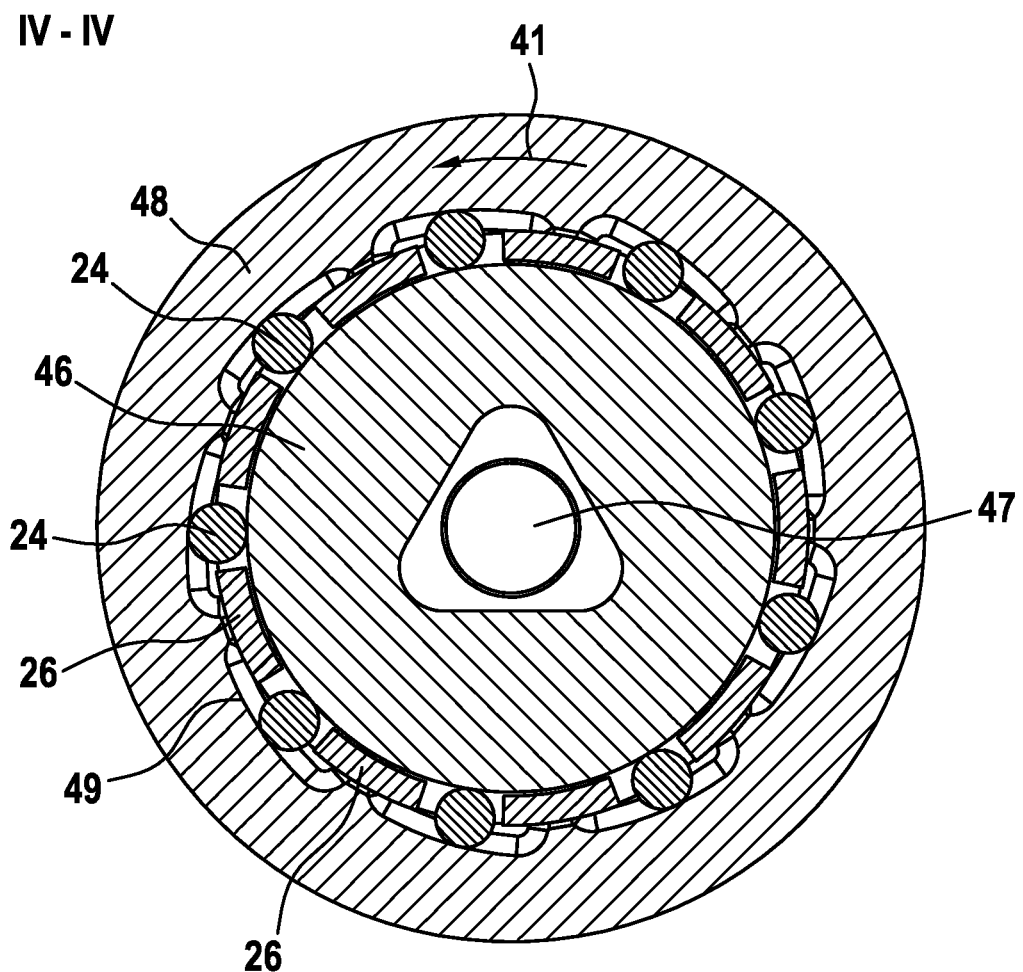
FIG. 6 shows the coupling unit of the cutting device in a coupled state, or in the assistance mode, in a schematic sectional representation in cross section Iv-Iv.
Figure 7:
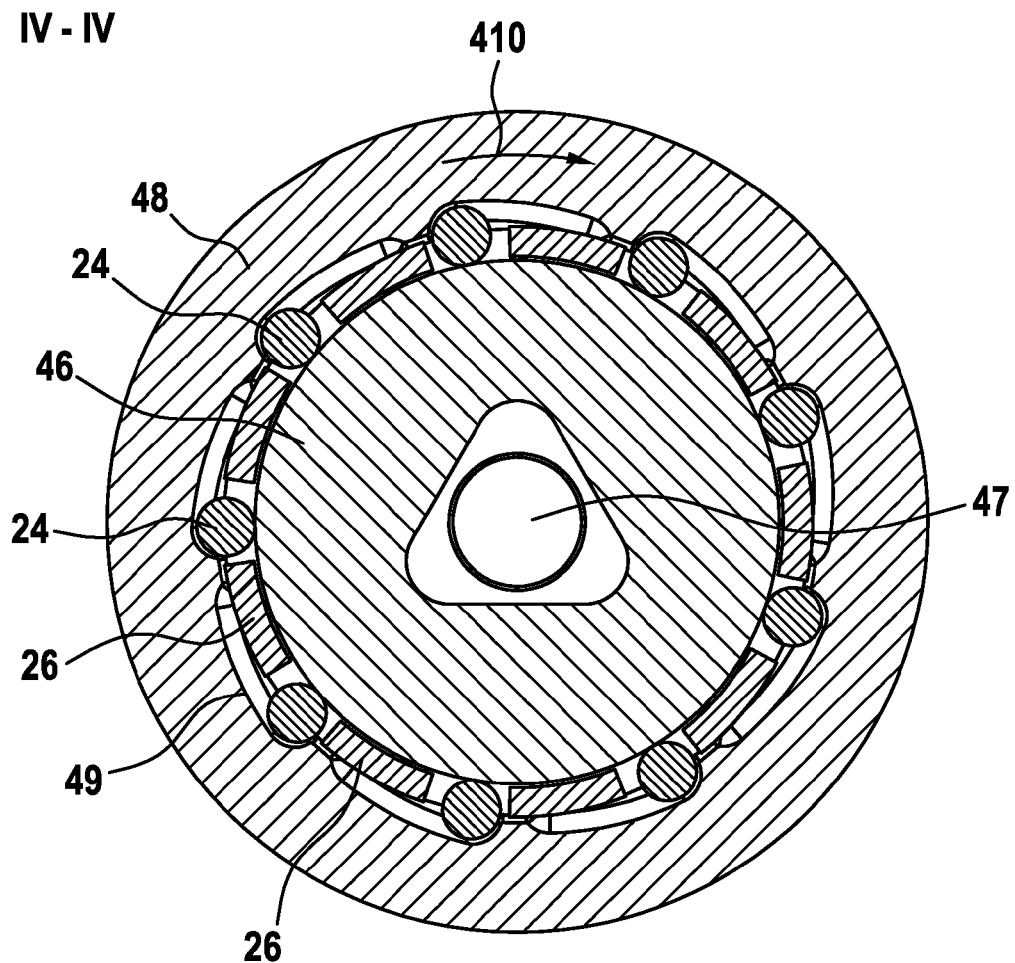
FIG. 7 shows the coupling unit of the cutting device in a decoupled state in a schematic sectional representation in cross section IV-IV.

Moreover, the coupling unit 22 has several clamping bodies 24 (FIGS. 6 and 7). By a "clamping body" is meant in this context in particular an element of the coupling unit 22 which in at least one operating state, especially in a closed state of the coupling unit 22, is designed to jam between two rotary elements of the coupling unit 22 which are mounted to rotate relative to each other. The clamping bodies 24 are arranged between the inner rotary element 46 and the outer rotary element 48. The clamping bodies 24 are arranged in the circumferential direction one behind the other around the inner rotary element 46. The clamping bodies 24 are designed as cylinders and/or a roller, especially as a cylindrical roller. Basically, however, some other configuration of the clamping bodies 24 would also be conceivable, such as a sphere or barrel or the like. The outer rotary element 48 comprises, on its inner side, several consecutive ramps 49 in the circumferential direction. A number of ramps 49 corresponds here to a number of clamping bodies 24. The clamping bodies 24 are arranged movable between the ramps 49, and when the outer rotary element 48 is rotated the clamping bodies 24 are driven along with it. If the outer rotary element 48 is driven in the circumferential direction against a ramp slope, the clamping bodies 24 roll in a narrowly tapering region between the outer rotary element 48 and the inner rotary element 46 and are pressed against the inner rotary element 46. This occurs when the outer rotary element 48 is driven in the driving direction 41. By a "driving direction" is meant in particular a direction of rotation of the driving element 20 in which the driving element 20 rotates in regular operation, in particular to assist a cutting movement. The inner rotary element 46 is driven along with it. The coupling unit 22 is closed in this state, as represented in FIG. 6. On the other hand, if the inner rotary element 46 is driven, regardless of a direction of rotation, the clamping bodies 24 remain in a valley of the ramps 49 or roll back into this and are spaced apart from the outer rotary element 48. The clamping bodies 24 are arranged free between the rotary elements 46, 48. There is no entrained rotation. The coupling unit 22 is opened in this state, as represented in FIG. 7. The outer rotary element 46 is driven via the gear unit 38 by the driving element 20. The gear unit 38 and the driving element 20 form a driving side of the coupling unit 22. If the inner rotary element 46 is driven against a driving direction 41, the clamping bodies 24 are moved into the valley of the ramps 49 and are likewise arranged free between the rotary elements 46, 48. The self-switching coupling unit 22 is arranged spatially between the cutting elements 12, 14 and the driving element 20. The self-switching coupling unit 22 is arranged spatially between a cable winch 32 and the gear unit 38. At least the cable winch 32 or a power takeoff element of the cable winch 32 forms a power takeoff of the coupling unit 22.

The self-switching coupling unit 22 has a cage 26 accommodating the clamping bodies 24 (FIG. 6, 7). The cage 26 accommodates the clamping bodies 24 in receiving areas which are separate from each other. The cage 26 serves for a positioning and guiding of the clamping bodies 24 in the circumferential direction. The cage 26 is designed to space the clamping bodies 24 apart and distribute them evenly in the circumferential direction. In particular, when there are several clamping bodies 24, it is possible for the clamping bodies 24 to perform the same movement in the circumferential direction. Preferably, a controlled clamping of the clamping bodies 24 can be made possible. The cage 26 is partly in the shape of a ring. The cage 26 is partly in the shape of a cylinder. On a cylindrical base body of the cage 26, several axially projecting webs in the shape of a circle segment are mounted, extending in the circumferential direction between the clamping bodies 24. The cage 26 is supported on the inner rotary element 46 of the coupling unit 22.

Figure 8:
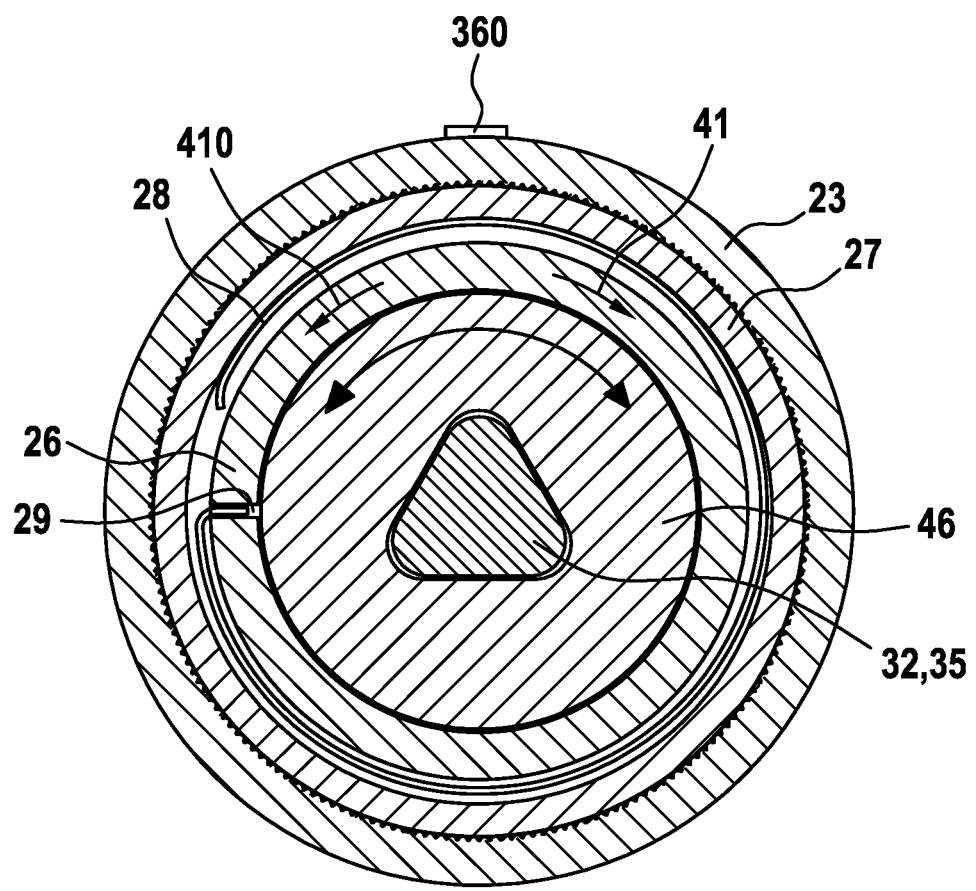
FIG. 8 shows the coupling unit of the cutting device in a schematic sectional representation in cross section V-V.

Moreover, the coupling unit 22 comprises a brake element 28, which is designed for a braking of the cage 26 (FIG. 8). The brake element 28 is designed as a spring element. The brake element 28 is designed as a kind of spiral spring. The brake element 28 is designed as a wrap spring. The brake element 28 is arranged by one end firmly in a recess 29 of the cage 26. The brake element 28 extends at least partly in the circumferential direction in a spiral around the cage 26. The brake element 28 is wrapped around the cage 26. An outer surface of the brake element 28 is at least partly braced against a securing element 27 radially surrounding the brake element 28 or the cage 26. The securing element 27 is designed as a securing ring or fixation ring. The securing element 27 is arranged stationary on the coupling unit 22. The securing element 27 is connected firmly, especially at least firm against rotation, preferably frictionally, to the housing 23 of the coupling unit 22. For better force transmission, the inner surface of the housing 23 is structured, in particular ribbed, in the region of the region where the securing element 27 is disposed. The brake element 28 enables a rotation of the cage 26 relative to the stationary grip housing 44 in one direction of rotation, especially in a driving direction of rotation, and blocks a rotation of the cage 26 in the opposite direction of rotation. The brake element 28 enables a rotation of the cage 26 relative to the housing 23 of the coupling unit 22 or to the securing element 27 in one direction and blocks a rotation of the cage 26 in the opposite direction of rotation. At least one portion, especially the greater portion of the outer surface of the brake element 28 presses by means of a spring force against the securing element 27 in the radially outward direction. The brake element 28 is designed to enable a freewheeling of the cage 26. The brake element 28 is designed to brake the cage 26 or curb a rotation in the counter-driving direction 410 or fix the cage in the counter-driving direction 410 and to enable a rotation or the cage 26 relative to the outer supporting surface or the securing element 27 in the driving direction 41, especially to enable this with low friction. This kind of wrap-around clutch drags its free end along during a rotation of the cage 26 in the driving direction 41 and thereby slides on the inner surface of the securing element 27. Upon turning in the contrary driving direction 410, on the other hand, this kind of wrap-around clutch spreads out and at least brakes or blocks the cage 26 relative to the securing element 27. The brake element 28 is designed to prevent an unwanted rotation of the cage 26. The brake element 28 is designed to prevent a rotating of the cage 26 until a force is applied, especially a force is applied by the driving element 20. The brake element 28 can also be designed as a locking pawl element, another element creating a freewheeling, or the like.

Moreover, the inner rotary element 46 comprises at least one, especially two form-fitting elements 460, 460'. The form-fitting element is designed as a flange, but it can also have a different form. The cage 26 likewise comprises a form-fitting element 260. The rotary body 370 comprises a form-fitting element 370. The securing element 27 comprises at least one form-fitting element 270. At least through the form-fitting elements 260, 270, 370, 460, 460' and also any frictional connections between rotary body 37 and inner rotary element 46, elements of the coupling unit 22 and the restoring unit 31 are securely connected to each other. Thus, an axial securing of these elements against each other is ensured. But the axial securing can also occur in a different manner. An additional bearing, for example by plain or roller bearing, is also advantageously unnecessary. Furthermore, thanks to the connection element 47 the outer rotary element 48 is also axially secured against the inner rotary element 46 and thus positioned by the securing element 27 axially to the coupling unit 22.

Figure 3:
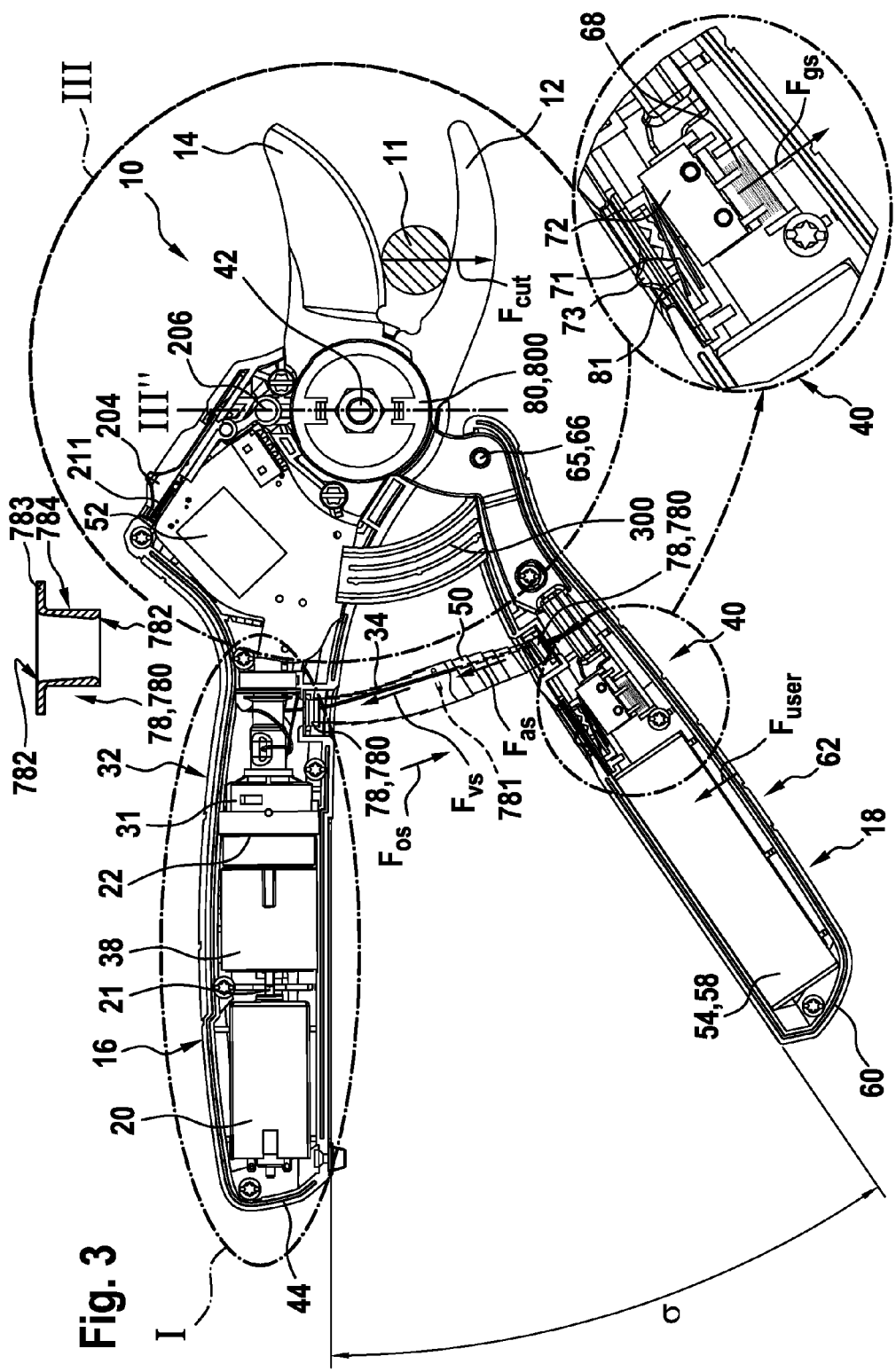
FIG. 3 shows the cutting device of FIG. 2, but wherein a force assistance mode is activated.
Figure 9:
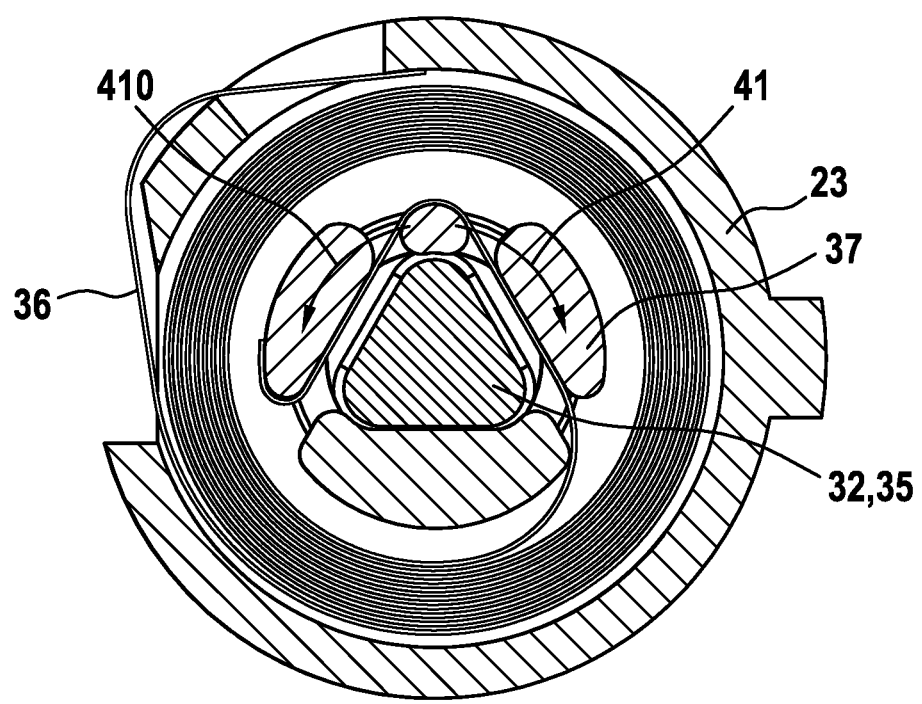
FIG. 9 shows the restoring unit of the cutting device in a schematic sectional representation in cross section VI-VI.

Furthermore, the cutting device 10 comprises a restoring unit 31 (FIG. 9). The restoring unit 31 is arranged in the first gripping element 16. The restoring unit 31 is advantageously arranged in the grip housing 44 of the gripping element 16. The restoring unit 31 is arranged in the coupling unit 22. Preferably, the restoring unit 31 is designed to ensure a tensioning of the cable. Preferably, the restoring unit 31 is designed to apply a force to the cable winch 32, especially a force in the circumferential direction. Especially preferably, the restoring unit 31 is designed to produce a tensile force through the cable winch 32 on the cable 34. In particular, the cable 34 should be held in permanent tension thanks to the restoring unit 31. Preferably, the restoring unit 31 produces a restoring force $F_{vs}$, which is less than an opening force $F_{os}$ of the opening spring 50 (FIG. 3). Thanks to the restoring unit 31, in particular, a tensioning of the cable 34 can be assured even during a full manual operation. Thus, advantageously, an unwanted knotting of the cable 34 can be prevented. Furthermore, a winding up of the cable 34 without drive power can be assured. The restoring unit 31 comprises a spring element 36 and a rotary body 37. One end of the spring element 36 is firmly connected to the housing 23 of the coupling unit 22. The other end of the spring element 36 is firmly connected to the rotary body 37. The spring element 36 is disposed radially between the housing 23 of the coupling unit 22 and the rotary body 37. The spring element 36 surrounds the rotary body 37 radially. The spring element 36 is wrapped several times around the rotary body 37. The restoring unit 31 is connected in particular via the rotary body 37 at least indirectly to the cable winch 32. The rotary body 37 is fixed by the spring element 36 with limited rotation ability relative to the grip housing 44 or the housing 23 of the coupling unit 22. The rotary body 37 is connected by a shaft 35 to the cable winch 32. The rotary body 37 is moreover advantageously connected by the shaft 35, firm against rotation, to the inner rotary element 46 of the coupling unit 22. The rotary body 37 can be connected at least via a radial and/or axial form-fitting element to the inner rotary element 46. The rotary body 37 has a coaxial recess. The recess is polygonal in configuration. The inner contour of the recess is formed corresponding to the outer contour of the shaft 35. The spring element 36 is designed to apply a force to the shaft 35 in the driving direction 41.

The spring element 36 is designed to apply a force to the inner rotary element 46 in the driving direction 41. The spring element 36 is designed to transmit via the cable winch 32 a tensile force to the cable 34. By the spring element 36, the cable 34 should be held permanently at tension, especially a tensile stress. To simplify the assembly of the cutting device 10, or at least that of the coupling and restoring unit 22, 31, the spring element 36 can be pretensioned and fixed by an assembly jig 360 relative to the housing 23 of the coupling unit 23. In this way, at least the restoring unit 31 can be installed with pretension, especially in connection with the coupling unit 22 as an assembly. Moreover, alternatively, the spring element 36 can be used to open the coupling unit 22 once the drive motor is deactivated. Thus, the inner rotary element 46 can be turned in the driving direction 41 via the spring element 36, so that in turn the cage 26 is braked via the brake element 28 once the drive motor 20 is deactivated. Thus, advantageously, an alternative reversal of the direction of rotation of the drive motor 20 for the opening of the coupling unit 22 can be avoided.

Moreover, the cutting device 10 comprises a cable winch 32 which can be driven by the driving element 20. The cable winch 32 is disposed in the first gripping element 16. Preferably, the cable winch 32 is designed to be drivable via the coupling unit 22 by the driving element 20. Preferably, the cable winch 32 can be decoupled in at least one operating state from the driving element 20 via the coupling unit 22. Thanks to the cable winch 32, an advantageous application of force of the driving element 20 can be achieved. In particular, a simple design for assisting a movement of the second cutting element 14 relative to the first cutting element 12 can be made possible in this way. Thus, a user can be advantageously assisted by the driving element 20 during a closing movement. Moreover, thanks to the application of force of the driving element to the gripping elements 16, 18, an advantageously large torque can be provided. This, in turn, can keep low a power of the driving element 20. The cable winch 32 is disposed in the grip housing 44 of the first gripping element 16. The cable winch 32 is arranged on a side of the coupling unit 22 facing the cutting elements 12, 14. The cable winch 32 is connected to the shaft 35. The shaft 35 is advantageously formed as a single piece with the cable winch 32. The shaft 35 is mounted by a bearing, especially by plain bearings 77, 77'. The bearing 77 facing the cutting elements 12, 14 is braced in the grip housing 44 of the gripping element 16. The bearing 77' facing away from the cutting element 12, 14 is braced in the housing 23 of the coupling unit 22. The shaft 35 is connected to the coupling unit 22. The shaft 35 is connected, firm against rotation, to the inner rotary element 46. Moreover, the shaft 35 is connected, firm against rotation, to the rotary body 37. The shaft 35 has a polygonal profile. It can also have a different profile for the connection to the coupling unit 22, such as a square, a tongue and groove, or another shaft and hub connection profile. Due to the fact that the cable winch 32 is connected directly to the inner rotary element 46 of the coupling unit 22 and the rotary body 37 of the restoring unit and furthermore these two elements are joined together, the device has a very compact construction. The self-switching coupling unit 22 can also be partly integrated in the cable winch 32. The coupling unit 22 can be partly enclosed by the cable winch 32. Moreover, the cable winch 32 forms a power takeoff side of the coupling unit 22.

The cable winch 32 comprises a cable drum 320. The cable drum 320 is substantially cylindrical in shape. An axial extension of the cable drum 320 is advantageously provided in order to wind up the cable 34 in only a single layer. The axial extension of the cable drum 320 is advantageously 5-15 mm, especially 6 mm. For the positioning of the cable 34 on the cable drum 320, this forms a shoulder at least on the side facing the pivot 42. The diameter of the cable drum 320 is advantageously less than 10 mm, especially 7 mm. The cable winch 32 has a mount 33 for the fixation of the cable 34. The mount 33 is fashioned as an opening or a through-hole in the transverse axial direction of the cable winch 32 or shaft 35. The mount 33 has an at least substantially rectangular cross section. The mount 33 can also be oval, round, polygonal or the like. The mount 33 can have a clamping seat for the advantageously secure and compact mounting of a cable end of the cable 34. In the region of the mount 33, the shaft 35 advantageously has a larger diameter than in the region of the cable drum 320. This is advantageously 8 mm.

The cutting device 10 furthermore comprises the cable 34. Preferably, the cable 34 is firmly fixed to the second gripping element 18 and secured to the first gripping element 18 so that it can be wound up via the cable winch 32. Preferably, the cable 34 is situated closer to the pivot 42, in regard to the gripping elements 16, 18, than to the ends of the gripping elements 16, 18 spaced away from the pivot 42, especially closer than 10 cm, preferably between 6 and 8 cm from the pivot 42. It is taut between the gripping elements 16, 18. The cable 34 can be mounted in the first gripping element 16 and/or second gripping element 18 via a guide element 780, especially a guide sleeve 78. The guide sleeve 78 is preferably a hollow cylinder and has a flange 783 at one end. The flange 783 can advantageously serve for the fixation on the first or second gripping element 16, 18. Moreover, the guide element 780 can position and/or fix the opening spring 50 on the first and/or second gripping element 16, 18. The cylinder of the guide sleeve 78 is oriented in particular transversely to the lengthwise dimension of the gripping element 16, 18, in the direction of the opposite gripping element 16, 18. An outer surface 784 of the cylinder supports the inside or inner surface of the opening spring 50. At least at one opening, especially at both openings of the guide sleeve 78, a fillet 782 is respectively provided. A radius of the fillet 782 is advantageously 0.6 mm. This contributes to a low-friction mounting of the cable 34. Moreover, the inner diameter of the cylinder widens conically in the direction of the flange 783. In this way, the cable 34 advantageously touches the guide element 780 only at the opening of the guide element 780 facing the other respective gripping element 16, 18, which likewise serves for a low-friction mounting of the cable 34 on the guide element 780 and a no-contact mounting of the cable 34 inside the opening spring 50 and/or enables a winding up of the cable 34 in nearly guided manner across the entire width of the drum. The cable 34 is taut between the two gripping elements 16, 18. The ends of the opening spring 50 are mounted on the guide sleeves 78 in the first and second gripping element 16, 18. The guide sleeves 78 are made of stronger material than the gripping elements 16, 18. The cable 34 is led inside the opening spring 50. The opening spring 50 is designed as an evolute spring, especially a double evolute spring. Preferably, the opening spring 50 in the relaxed state has a length of less than 100 mm, especially 70 mm. In the compressed state, the opening spring 50 has a length of less than 25 mm, especially 17 mm. The opening spring 50 in the compressed state has for example an opening force of less than 100 N, especially 32 N. A diameter of the spring is, for example at the ends, 4 to 8 mm, especially 6.6 mm, and in the middle of the opening spring 50 around 10 to 15 mm, especially 11 mm. The opening spring 50 is advantageously designed to make possible an opening angle izr of the gripping elements 16, 18 around the pivot 42 of up to 70°, especially of up to 50° and especially preferably of up to 35°.

The cable 34 can be mounted inside the opening spring 50 with low friction. The cable 34 can be mounted inside the opening spring 50 free of damage, so that a damaging of the cable by sharp edges of the opening spring 50, for example, is prevented. The opening spring 50 can have additional guide elements 781, which lead the cable 34 in protective and low-friction manner inside the opening spring 50. The cable 34 is advantageously made of polyethylene, especially polyethylene with ultrahigh molar mass (UHMW-PE). It is a Dyneema® cable 34. Advantageously, it has a diameter of 2 mm and withstands for example a repeated tensile force of 1000 N and a winding up on the cable drum 320. Such a cable 34 is especially resistant to abrasion. It can be arranged directly in the opening spring 50 or led through the opening spring 50 with no further friction- or damage-reducing elements. It has good winding properties, high strength, and good aging resistance and toughness. However, the cable 34 can also be made of polyacrylics, Kevlar, wire or the like. The cable 34 is connected in a region between the pivot 42b and an end of the second gripping element 18 facing away from the cutting elements 12, 14 at least indirectly to the second gripping element 18. It can exert on this an assisting force via the driving force transmission element 340 for the closing of the cutting elements 12, 14. The cable 34 is connected via the force transmission element in the form of the lever 80 to the second gripping element 18. At the first gripping element 16, the cable 34 can be wound up in variable manner on the cable winch 32. Due to the fact that the cable 34 is led in the opening spring 50, it can be advantageously prevented that a user will be disturbed by the cable 34 when using the cutting device 10. Furthermore, a damaging, a soiling, an exposure to the weather elements, damage to the cable 50 and/or the like can be prevented in particular by the use of the evolute spring. Thanks to a driving of the cable winch 32, a free length of the cable 34 can be varied, or a spacing or opening angle σ of the gripping elements 16, 18 and/or an opening angle of the cutting elements 12, 14 can be varied (FIG. 2, 3).

A drive train for the force-assisting operation of the manual machine tool is advantageously formed by the following elements: drive motor 20, gear unit 38, coupling unit 22, restoring unit 31 and cable winch 32. These elements are arranged serially, especially in the aforementioned order. They are preferably arranged in the first gripping element 16. When required, the drive motor 20 drives the gear unit 38, which drives the cable winch 32 via the coupling unit 22. The restoring unit 31 holds the cable 34 permanently under tension and can be designed, in concert with the elements of the coupling unit 22, to decouple the coupling unit 22 during a switch from the force-assisted to the non-force-assisted operation. The drive train is advantageously mounted or fixed in the grip housing 44 solely via the housing of the motor unit 20, the housing 74 of the gear unit 38, the housing 23 of the coupling unit 22, as well as the rotary bearing 77 of the cable winch 32 facing the cutting elements 12, 14. The coupling unit 22 and the restoring unit 31 are very compact in design and enable an easy assembly. The first gripping element 16 can at least be made compact or short as a result. An extension of the first or second gripping element 16, 18 between an end of the first or second gripping element 16, 18 facing away from the pivot 42 and the opening spring 50 is less than 150 mm, especially 120 to 130 mm. An extension of the first or second gripping element 16, 18 from the end facing away from the pivot 42 up to the pivot 42 is advantageously less than 200 mm, especially 170 to 190 mm. The overall extension of the cutting device 10 is advantageously less than 300 mm, especially 200 to 300 mm, preferably 250 to 260 mm. An envelope circle diameter around the first gripping element 16 in the grip region 62 is advantageously less than 40 mm, especially 30 to 35 mm. An envelope circle diameter around the second gripping element 18 in the grip region is advantageously less than 30 mm, especially around 25 mm. Advantageously, the cutting device 10 achieves similar feel and/or ergonomics to a nonmotorized, purely manual cutting device. Furthermore, it is possible to arrange the drive train and to arrange the energy storage unit 54 at least in one of the gripping elements 16, 18.

Furthermore, at least one of the gripping elements 16, 18 has an at least partly elastic and/or beveled and/or rounded region 620 at least at the transitions of the grip inside 600 to the side surfaces 610 of the at least one gripping element 16, 18 (FIG. 1). The region can be set back relative to the side surface 610 in the direction of a parting plane of the housing shells of the at least one gripping element 16, 18. By the grip insides 600 is meant in particular the facing inner surfaces of the grip. An opening angle of the beveled regions 620 of both gripping elements 16, 18 relative to each other is advantageously between 30° and 150°, or the angle between an imaginary parting plane between the gripping elements 16, 18 and a beveled region 620 of the first or second gripping element 16, 18 is half of that. In particular, the opening angle between the pivot 42 and the ends of the gripping elements 16, 18 facing away from the pivot 42 varies at least between 60° and 120°.

A sector length s of the beveled surface is advantageously 5 to 10 mm and can likewise vary in its length. In the region of the ends of the gripping elements 16, 18 facing away from the pivot 42 there is provided a spacing element 630 at the inner surfaces of the grip, especially a soft stopping element. The outside 64 of the gripping elements 16, 18 is advantageously likewise rounded, especially rounded according to the aforementioned envelope circle diameter of the respective gripping element 16, 18. The outside 64 has advantageously a soft grip surface in order to heighten user comfort and/or a structuring to prevent slippage during use. The gripping elements 16, 18 are designed to at least almost touch. Advantageously, an unwanted pinching, especially a pinching of the skin on a user's hand, can be avoided thanks to the elastic or rounded configuration of the grip insides. This enhances the safety of use of the cutting device 10. An envelope circle diameter around the closed cutting device 10 is advantageously less than 100 mm, in particular an envelope circle diameter around the grip region 62 of the closed gripping elements 16, 18 is less than 70 mm, preferably 50 to 60 mm.

Moreover, the cutting device 10 comprises a control unit 52. The control unit 52 is disposed in the first gripping element 16. The control unit 52 is disposed in the grip housing 44 of the gripping element 16. The control unit 52 is designed to actuate the driving element 20. Basically, there can be both a pure controlling of the driving element 20 and a regulating of the driving element 20. For this, the control unit 52 supplies energy to the driving element 20. But in theory, the driving element 20 can also be connected directly via the switch 72 to the energy storage unit 54. The control unit 52 is arranged between the driving element 20 and the pivot 42. The control unit 52 is arranged between the cable winch 32 and the pivot 42. The control unit 52 is advantageously connected to an indicator element 200. The indicator element 200 displays an activation or an operation of the driving element 20, but can also enable some other form of indication of states. The indicator element 200 is a light. The light is a LED. The indicator element 200 can display to a user, for example through the color of the light, information about the charge status of an energy storage unit 54, the assistance force during an assistance mode, or the like, and/or indicate whether an assistance mode is active or not. The control unit 52 is connected to the energy storage unit 54. Via the energy storage unit 54, the driving element 20 can be supplied with energy by the control unit 52. The energy storage unit 54 comprises at least one storage battery. The storage battery 58 is formed from lithium ion cells. Basically, however, some other design of the at least one storage battery 58 would also be possible. The storage battery 58 is arranged in the second gripping element 18. The storage battery 58 is arranged in a grip housing 60 of the second gripping element 18. The storage battery 58 is connected to the control unit 52 (FIG. 2, 3).

Figure 11:
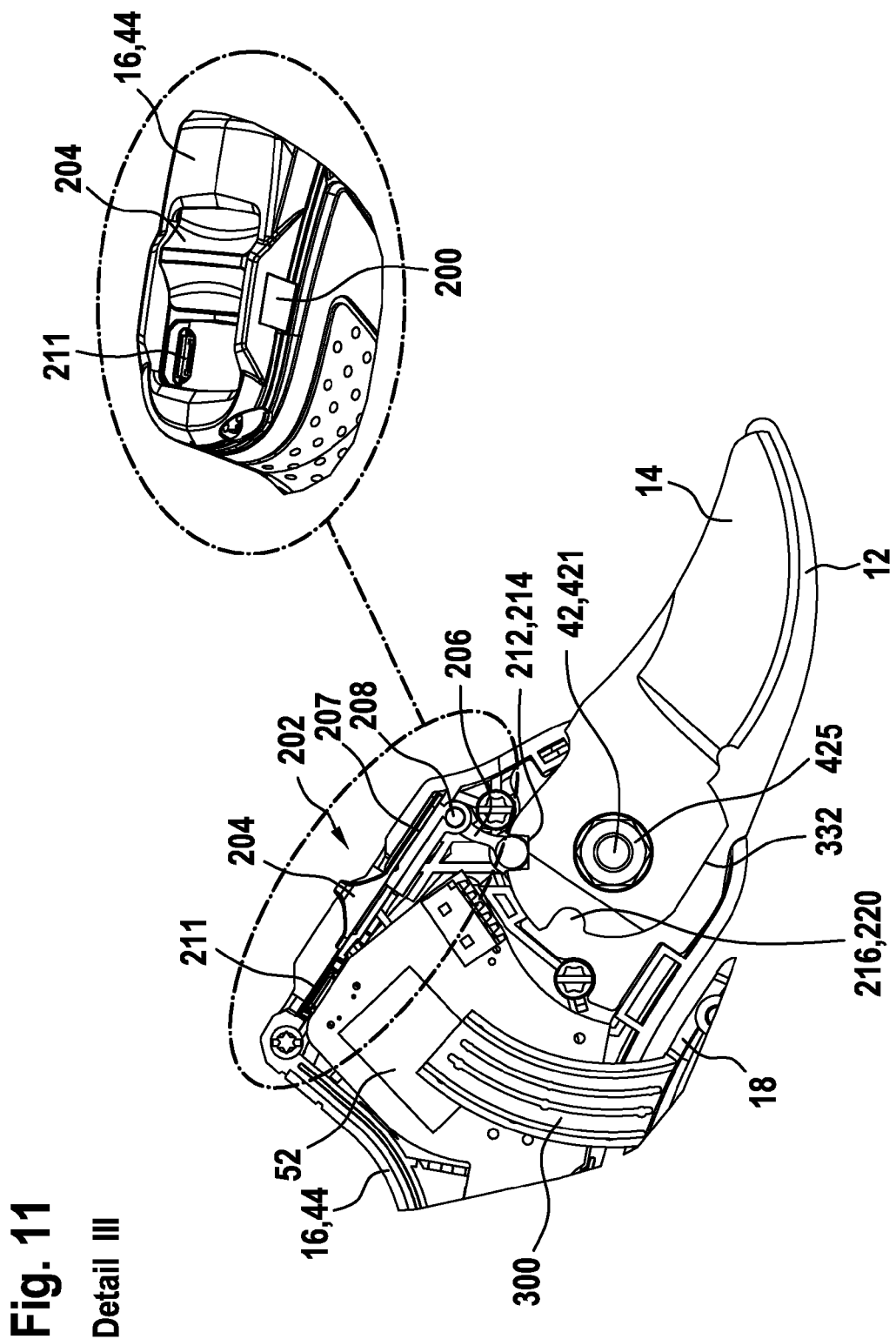
FIG. 11 shows a blocking device in a sectional representation of Detail III as well as a partial cutout view of the blocking device, in a first state.

Moreover, the battery-operated manual machine tool or cutting device 10 comprises a blocking device 202. The blocking device 202 is arranged on the first gripping element 16. The blocking device 202 is arranged in the grip housing 44 of the gripping element 16. FIG. 11 shows a cutout view of the cutting device 10 and the blocking device 202 in a first state. The cutting elements 12, 14 of the cutting device 10 are in a closed state. The blocking device 202 is in a first position. The blocking device 202 blocks an activation and/or tool movement of the cutting device 10 to each other, especially that of the cutting elements 12, 14 or gripping elements 16, 18. The blocking device 202 is designed as a mechanical blocking device 202. The blocking device 202 comprises a sliding switch 204. The sliding switch 204 is designed to block and/or close a charging interface 211, or to release it. The sliding switch 204 is intended to be moved by a user, especially using one finger of a user. The blocking device 202 comprises a detent element 206. The detent element 206 is designed to mechanically block or release a relative movement of the two cutting elements 12, 14 to one another. The sliding switch 204 is mechanically connected to the detent element 206. The sliding switch 204 is connected via a pivot 208 to the detent element 206. The blocking device 202 is arranged in the region of the control unit 52. The blocking device 202 is arranged in the region of a thickening of the gripping element 16. The blocking device 202 or the sliding switch 204 of the blocking device can be activated advantageously at least by one thumb of the user in a single-handed operation of the cutting device 10. The sliding switch 204 is guided or mounted in lengthwise movable manner through grooves 207 in the gripping element 16. The sliding switch 204 can be moved relative to the gripping element 16. The sliding switch 204 is designed to close or at least partly release an opening 209 of the grip housing 44. The sliding switch 204 is designed to cover or close the charging interface 211, or to release it. The sliding switch 204 is designed to release the charging interface 211 in the first position and to close the charging interface 211 in a second position.

The detent element 206 is connected at one free end to the pivot 208. The detent element 206 has a locking element 210 at the other free end. The detent element 206 is designed to engage, by means of the locking element 210, in a first and a second recess 212, 214 of the first and second cutting element 12, 14, as long as the cutting elements 12, 14 are in a closed state. In the closed state, the first and second recess 212, 214 of the cutting elements 12, 14 are aligned in the direction of the axis of rotation 149 of the pivot 42. The detent element 206 or locking element 210 in this position is designed to engage in the aligned recess 212, 214.

Figure 12:
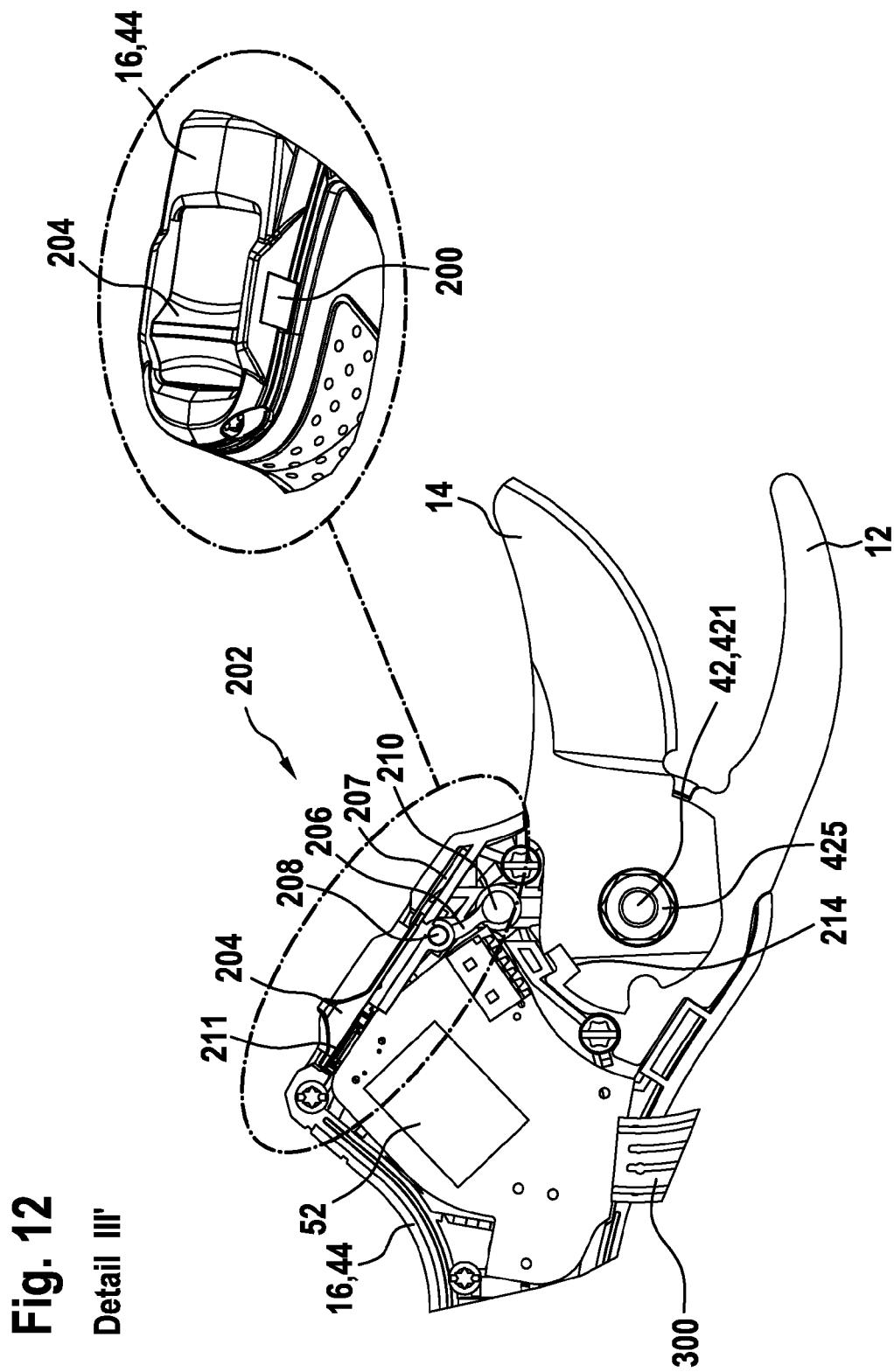
FIG. 12 shows a blocking device in a sectional representation of Detail III' as well as a partial cutout view of the blocking device, in a second state.

FIG. 12 shows the blocking device 202 in a second state. The blocking device 202 is in the second position. The cutting elements 12, 14 of the cutting device 10 are in an opened position. In the second state, the cutting elements 12, 14 can move relative to each other. The cutting device 10 is in a state at least intended for manual operation. In the second position of the blocking device 202, the blocking device 202 releases an activation and/or tool movement of the cutting device 10, especially of the cutting elements 12, 14 or gripping elements 16, 18, relative to each other. The charging interface 211 is blocked or closed by the sliding switch 204 of the blocking device 202. The detent element 206 does not protrude into the recesses 212, 214 of the cutting elements 12, 14. At least one of the recesses 212, 214 can also be arranged in at least one structure connected firm against rotation to one of the cutting elements 12, 14. For example, the recess 214 can also be arranged in the lever 80. On both the sliding switch 204 and the gripping element 18 there can be arranged a seal element (not shown), which enables a sealing of the charging interface 211. The seal element is arranged in particular between the gripping element 18 and the sliding switch 204. The at least one seal element advantageously provides for a sealing of the charging interface 211 in the second position of the blocking device. Thus, advantageously, the control unit 52 or other electronic components of the cutting device 10 which are at least in electronic contact with the charging interface 211 can also be protected against dust and moisture, especially during operation of the cutting device.

The cutting device 10 moreover comprises the force transmission element in the form of the lever 80. The lever 80 connects the second cutting element 14 to the second gripping element 18. The lever 80 comprises at least one form-fitting element for the connection to the cutting element 14.

The second gripping element 18 is connected by at least one further pivot 65 to the lever 80. The gripping element 18 and the lever 80 are able to swivel relative to each other at least to a limited degree. The gripping element 18 and the lever 80 swivel about the further pivot 65. The gripping element 18 and the lever 80 are able to swivel relative to each other about the swivel axis 66. The swivel movement is limited at least by the inner contour of the hollow gripping element 18. Moreover, the swivel movement can be limited by a form fitting-element configured in the gripping element 18. The gripping element 18 is moreover braced against the lever 80 by means of a spring 68. The gripping element 18 is braced at one free end of the lever 80 against the lever 80 by means of the spring 68.

The cutting device 10 moreover comprises a sensor 401. The sensor 401 is designed to sense an operating state in which a force assistance mode is required. Advantageously, the sensor 401 or other sensors (not shown here) can sense an operating state in which an assistance mode needs to be discontinued or switched off for purposes of operating safety of the cutting device, especially when an object 17 is arranged between the gripping elements 16, 18. Preferably, the sensor 401 is a force sensor 40 which is designed to sense a force acting on the second gripping element 18, especially relative to the first gripping element 16 and/or relative to the lever 80. Preferably the force sensor 40 can be designed both to detect a precise force and merely a transgressing of a limit force. The force sensor 40 is arranged on the second gripping element 18 and/or on the force transmission element, designed as a lever 80. The force sensor 40 is advantageously integrated in the second gripping element 18. The force sensor 40 is arranged between the lever 80 and the gripping element 18. The force sensor 40 comprises at least one spring 68 and a switch 72, especially a microswitch. The spring 68 braces the lever 80 advantageously against an outer side 64 of the second gripping element 18. As long as a cutting force $F_{ew}$ is acting on the cutting elements 12, 14, during a closing of the cutting device 10, for example in order to cut a material 11 being cut, the second gripping element 18 can be moved, in particular swiveled, relative to the force transmission element or the lever 80, against the spring force $F_{gs}$ of the spring 68. For this, the lever 80 and the gripping element 18 are arranged able to swivel about the common further pivot 65. The spring 68, as it were, couples the gripping element 18 to the lever 80 in at least one operating state. The lever 80 has a recess and the gripping element 18 a projection, which forms an axis of rotation 66, especially when the two grip shells of the second gripping element 18 are joined, about which the lever 80 can turn or swivel in at least a limited degree. The gripping element 18 is advantageously able to swivel in limited degree relative to the lever 80 about the axis of rotation 66. The swivel limitation is provided by at least corresponding form-fitting elements at the second gripping element 18 and the lever 80. Moreover, the spring 68 can also constitute a swivel limitation, especially the compressed spring 68. The second gripping element 18 is advantageously braced against the lever 80 by means of the spring 68 at one free end of the lever 80. Advantageously, a mounting element 69 is shoved onto the lever 80. The mounting element 69 advantageously serves as a mount, especially a guide mount, for the spring 68 and advantageously as a mount for the switch 72, especially as a plug mount. So long as the operating force $F_{user}$ exerted on the gripping element 18 for the activation of the cutting element 12, 14 is greater than a spring force $F_{gs}$, the gripping element 18 swivels relative to the lever 80. In the present case, the outer side 64 of the gripping element 18 comes closer to the lever 80.

In order to detect this swivel movement or swiveling force or to detect at least a crossing of a threshold value, a movement of the spring 68 and/or the like, the force sensor 40 has a switch 72. The switch 72 is designed as a microswitch, especially as an opener or changer. The switch 72 has a trigger element, designed as a pressure element. The pressure element is designed as a swivel element 71, especially a swiveling lever. It is provided for an activation of the switch 72. The switch 72 advantageously senses a swiveling away or a distancing of the switch 72 from the inside 63 of the second gripping element 18. Thus, the switch 72 is activated upon swiveling out of the swivel element 71. Or in other words the switch 72 is deactivated in a state in which the swivel element 71 bears against the switch 72, and deactivated in a state in which the swivel element 71 is swiveled out relative to the switch 72. Thus, the switch 72 closes upon a defined swiveling out of the swivel element 71. The swivel element 71 can be braced directly against the housing of the gripping element 18 or against an additional pressure element 81 or the like. Moreover, the pressure element 81 can be designed such that it is provided for the selection of a sensitivity of the force sensor 40. The pressure element 81 is advantageously part of the force sensor 40, which is advantageously disposed at a further switch 73. The further switch serves as an assistance mode adjustment element. The further switch 73 is advantageously able to move transversely to the swivel element 71. The further switch 73 can move in the direction of the pivot 42. The further switch 73 is arranged on the side of the second gripping element 18 facing the first gripping element 16. Thus, the further switch 73 is arranged on the inside 63 of the second gripping element 18. An unintentional activation of the further switch 73, especially during a cutting process, can be prevented in this way. The further switch 73 is designed as a sliding switch. The further switch 73 has a pressure element 81 which is wedge shaped. The pressure element 81 is designed to make contact with the swivel element 71 in all operating states. By a displacement of the further switch 73 relative to the switch 72 or the swivel element 81, the sensitivity of the force sensor 40 or a threshold value for the triggering of the switch 72 can be varied. Thanks to the trigonometric distance relationship of the pressure element 81 to the swivel element 71, especially the lever length of the lever 80 within the second gripping element 18, the sensitivity of the force sensor 40 can be altered upon displacement of the further switch 73. When the further switch 73 is displaced in the direction of the first or second cutting element 12, 14, the switch 72 is activated only at a larger operating force $F_{user}$. When the further switch 73 is displaced in the opposite direction, on the other hand, the switch 72 is activated at a lower operating force $F_{user}$. Thus, in an economical manner with mechanical means, the sensitivity of the force sensor 40 can be adjusted. Different activation levels or threshold values can be adjusted for the assistance mode of the cutting device 10, for example in dependence on a varying hand force of a user. The further switch 73 advantageously has three detent positions in connection with the switch mount, especially the gripping element 18. In this way, three assistance mode levels can be defined advantageously. Thanks to the design, an additional on/off switch for the activation of an alternative, purely electronic force or displacement sensor is unnecessary, which would need a permanent electrification in order to sense a defined crossing of a threshold value. Advantageously, therefore, the switch 72 and thus the assistance drive is only activated when a mechanical force of the spring 68 in the form of a threshold value is crossed. Or in other words, a threshold value depending on the spring-loaded swivel movement of the lever 80 within the gripping element 18 about the pivot 67 is crossed, so that the switch 72 is triggered. In this way, an especially economical and simple-design force sensor 40 can be provided.

Moreover, the driving force transmission element 340 in the form of the cable 34 being in operative connection with the driving element 20 engages with the lever 80. Upon activation of the driving element 20, the lever is thus subjected to the driving force $F_{an}$ and assists the closing movement of the cutting elements 12, 14. Thus, the lever 80 decouples the driving force $F_{an}$ from a direct force application to the gripping element 18. For example, if during a force assistance mode of the cutting device 10 an object 17 is found between the gripping elements 16, 18, the gripping elements 16, 18 can no longer move toward each other. The driving force $F_{an}$ moves the lever 80 within the gripping element 18 in the direction of its starting position, the switch 72 is opened, and the force assistance mode is ended. Thus, the force sensor 40 or the lever 80, the spring 68 and the switch 72 decouples a force assistance mode for the pressing together of the gripping elements 16, 18. Thus, so long as an object 17 is found between the gripping elements 16, 18, the switch 72 will necessarily be opened and the driving element 20 deactivated, so that there can be no undesirable pinching of, for example a part of the body or skin of the user, or a damaging of the gripping elements 16, 18, for example if a branch is found between them. In such instances, only the operating force $F_{user}$ will be instrumental in a squeezing of the object 17. Thanks to the arrangement of the lever 80 in the gripping element 18, in particular, a presence of an object 17 in the entire region between the further pivot 65 of the lever and the ends of the gripping elements 16, 18 facing away from the pivot 42 can be recognized and the assistance mode switched off. No additional sensor (not shown here) is needed for recognizing an object 17 between the gripping elements 16, 18. Thus, advantageously, only the force sensor 40 is needed, which is triggered by a crossing of a threshold value, in order to activate the assistance mode, and at the moment when an object 17 is present between the gripping elements 16, 18 it necessarily switches off the assistance mode. In this way, the fault vulnerability and risk of injury, as well as the control engineering expense in order to possibly several alternative sensors for recognition of the different operating instances—force assistance mode necessary, object 17 present between the gripping elements 16, 18—is far less.

Basically, however, an alternative configuration of the force sensor 40 would be conceivable. For example, by a force sensor on the grip surface of the first or second gripping element 16, 18 or a displacement sensor for recognition of the relative movement between the second gripping element 18 and the lever 80 or other kinds of sensors for recognition of an operating force $F_{user}$ acting on the gripping elements 16, 18 and/or for recognition of a reactive force caused by the object 17 between the gripping elements 16, 18 and opposing the closing movement of the gripping elements 16, 18. Alternative arrangements of the spring 68, the switch 72 or the further switch 73 to realize the same functionality are also conceivable. In this way, one could likewise detect the forces currently present on the gripping elements 16, 18, especially the need for the force assistance mode and the special instance of an object 17 between the gripping elements 16, 18 and discontinuance of the force assistance mode. Moreover, a triggering force of the force sensor or sensors 40 could be defined freely by software. Basically, furthermore, it would be conceivable for the force sensor 40 to distinguish among different degrees of depressing of the switch 72 or swiveling of the swivel element 71 in order to infer a precise operating force $F_{user}$ that is present.

Moreover, the force sensor 40 is connected to the control unit 52. The control unit 52 is designed to control the driving element 20 in dependence on a signal of the force sensor 40. The control unit 52 is designed to activate the driving element 20 when a defined measurement value of the force sensor 40 is crossed. The control unit 52 is designed to activate the driving element 20 upon a closing of the switch 72 of the force sensor 40. Moreover, the control unit 52 is designed to halt the driving element 20 upon opening of the switch 72 of the force sensor 40. A direct connection of the power takeoff unit 20 to the energy storage unit 54 via the switch 72 and without the control system 52 is also conceivable.

For an operation of the cutting device 10, one can distinguish between a manual mode of the cutting device 10, in which a complete cutting force $F_{cut}$ is applied by a user, and an assisted mode in which a portion of the cutting force $F_{cut}$ is furthermore applied by the driving element 20.

The second cutting element 14 is designed as an active cutting element 14 with cutting edge. It is designed as an interchangeable cutting element 14. The second cutting element 14 is connected by at least one form-fitting element 216 (FIG. 11, 12) to the lever 80 of the cutting device 10, which in turn is connected to the second gripping element 18. The form-fitting elements 216 are designed at least to transmit forces in the radial direction about the axis of rotation 420, but can also be designed to transmit axial forces $F_{ax}$ in the direction of the axis of rotation 420, to the lever 80 or the cutting element 14. On the lever 80 is formed a locking lug 220, which engages with the form-fitting element 216 of the cutting element 14 in the connected state. Moreover, at least one axial guide surface 332 is provided for inserting the cutting element 14 into the cutting element mount 400.

Figure 13:
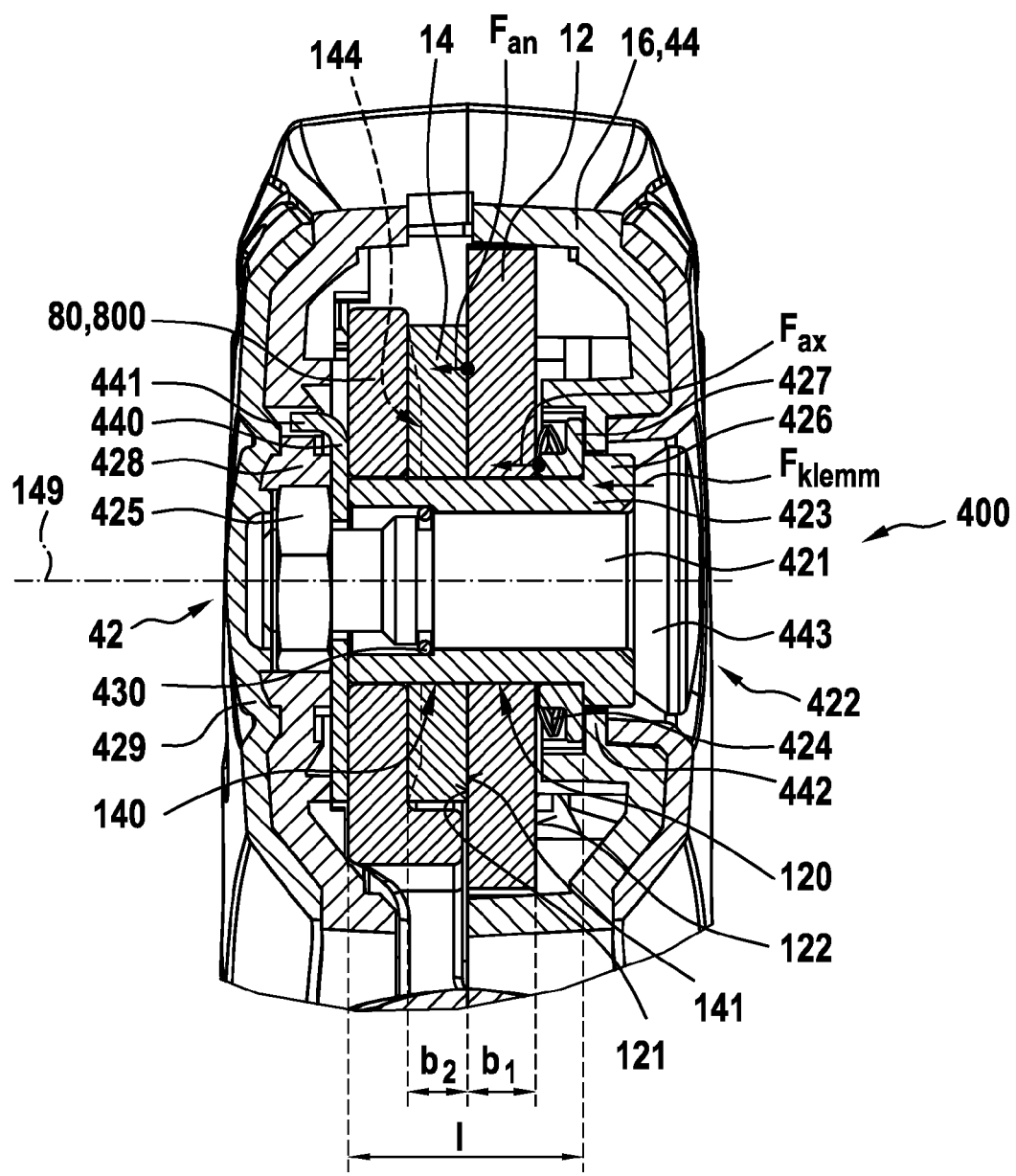
FIG. 13 shows a cutting element mount of the cutting device in a sectional representation in cross section III'-III'.

FIG. 13 shows a cross section III-III' through the cutting device 10 and the cutting element mount 400. The first and the second cutting element 12, 14 are connected indirectly by a shaft arranged along the axis of rotation 420. The shaft forms a pivot 42 for the cutting elements 12, 14. The shaft is at least formed by a connection element 421. On the connection element 421, moreover, there is arranged a spacing element 423. The spacing element 423 serves at least for the axial, and in the present instance also the radial spacing of the connection element 421 from the cutting elements 12, 14. The spacing element 423 can be fixed by a securing element 430 to the connection element 421. The connection element 421 can also be designed as a single piece with the spacing element 423. The connection element 421 is designed as a screw. The screw can be loosened and advantageously removed along with the spacing element 423 from the cutting device 10 or the grip housing 44. The spacing element 423 is part of a control device 422, which independently of a clamping force $F_{klemm}$ of the connection element 421 applies a defined pressing force $F_{anpr}$ of the cutting elements 12, 14 against each other in the direction of the axis of rotation 420. The cutting elements 12, 14 have through-boreholes 120, 140 in the direction of the axis of rotation 420, through which the connection element 421 protrudes. The radial surfaces of the through-boreholes 120, 140 form bearing surfaces, which are arranged on a corresponding bearing surface of the spacing element 423 or a sleeve radially encircling the connection element 421.

The spacing element 423 at least indirectly establishes a minimum spacing of two clamping force transmission elements in the direction of the axis of rotation 420, here in the form of the screw head 443 of the screw and in the form of an abutment 425, wherein the abutment is designed as a screw nut, especially a screw nut mounted firm against rotation, to which the screw is connected. These clamping force transmission elements transmit a pretensioning force $F_{klemm}$ of the connection element 421 at least indirectly to the spacing element 423. The spacing element 423 transmits only a definable portion of the clamping force $F_{klemm}$ to the axial surfaces 121, 141 of the cutting elements 12, 14. Thus, at least an axial position of the two cutting elements 12, 14 along the axis of rotation or a friction force between the cutting elements 12, 14, which occurs when these swivel relative to each other, can be established independently of a tightening torque of the connection element 423 or independently of another factor of influence.

FIG. 1

A lengthwise dimension 1 of the spacing element 423 in the direction of the axis of rotation 420 enables a relative movement of the cutting elements 12, 14, especially a swivel movement of the cutting elements 12, 14 to each other. This corresponds advantageously at least to the sum of the widths $b_1$, $b_2$ of the two cutting elements 12, 14 along the axis of rotation 420. In this way, independently of the clamping force $F_{klemm}$ of the connection element 421 or the tightening torque of the screw, a distance or a maximum pressing force $F_{an}$ can be established between the cutting elements 12, 14, at least in the non-activated state of the cutting device 10, so that an activating ability of the cutting device 10 is guaranteed.

Moreover, the control device can comprise an elastic element 424, which applies a defined axial force or clamping force $F_{klemm}$ to the cutting elements 12, 14 against each other along the axis of rotation 420. The elastic element 424 is designed as a spring, especially a compression spring, especially preferably a corrugated spring. The elastic element 424 is arranged indirectly between an axial surface 122 of the first cutting element 12 and a radial shoulder 426 of the spacing element 423. The elastic element is arranged between the axial surface 122 of the first cutting element 12 and a securing ring 427. The securing ring 427 is braced against the shoulder 426 of the spacing element 423. Moreover, the securing ring 427 is also braced against the grip housing 44. The force with which the elastic element 424 is compressed corresponds to the axial force $F_{ax}$ and acts as a pressing force $F_{an}$ or as a pressing force or normal force between the two cutting elements 12, 14. Thus, the elastic element 424 adjusts a friction force between the cutting elements 12, 14. In this way, a basic activating force for the closing of the cutting device 10 can be at least partly established. In this way, a basic distance between the cutting elements 12, 14 can be adjusted. Regardless of the manufacturing width—within a tolerance band—of the cutting elements 12, 14, the pressing force $F_{an}$ of the cutting elements 12, 14 against each other remains approximately constant, due to the spring constant of the elastic element 424. Further tolerances of the cutting element mount 400 can also be equalized. Advantageously, a sheet of paper as well as a tree branch can thus be cut by the cutting device 10, since the cutting gap can be adapted to the requirement dictated by the material 11 being cut. A replacement of the second cutting element 14 is possible without fine tuning the clamping force or a tightening torque of the screw or a changing of intermediate elements. Regardless of the clamping force or the tightening torque of the connection element 423 or the screw, the pressing force $F_{an}$ between the cutting elements 12, 14 remains almost constant. The corrugated spring advantageously has an outer diameter in the range of 20 mm and an inner diameter in the range of 15 mm. A free axial length of the corrugated spring is advantageously less than 5 mm, especially 3.25 mm. The clamping force of the corrugated spring is advantageously 15 to 25 N, for a compressed length of 1.1 to 1.5 mm.

Moreover, when the connection element 423 is loosened and especially when the connection and spacing element 421, 423 is entirely removed, the securing ring 427 is axially braced against the grip housing 44. Thus, at least a reduced axial force $F_{ax}$ of the spring or a pressing force $F_{an}$ at least against the first cutting element 12 is preserved. In this way, the second cutting element 14 being replaced can be at least positioned, even without connection element 421, and/or is secured against unintentional dropping out from the cutting device 10.

For at least the transmission of the axial force $F_{ax}$ of the elastic element 424, the first in particular stationary cutting element 12 is also designed to be transversely movable, i.e., movable in the direction of the axis of rotation 420. It is secured in the direction of rotation about the axis of rotation 420 by form-fitting elements. These are braced against corresponding form-fitting elements in the first gripping element 16. In particular, the corresponding form-fitting elements are connection elements for the connecting of the grip shells of the first gripping element 16.

The elastic element 424 also serves as an overload protection element of the cutting device 10. It prevents a plastic deformation of the cutting elements 12, 14 in operation of the cutting device 10. Thanks to the elastic element 424 a threshold value $F_{ax}$ is adjusted, after which the cutting element 10 can gape open. Upon exceeding the spring force $F_{ax}$ the elastic element yields, at least as far as the axial stop of the second cutting element 14 against an end stop element 442 and thus enables at least a slight axial displacement and/or a tilting within the first gripping element 16 or along the axis of rotation 420. The elastic behavior and the desired gaping upon crossing a defined threshold value can be adjusted through the spring force of the elastic element 424 and the arrangement of the control device 422. In the present instance, the control device 422 comprises at least the connection element 421, the spacing element 423, the securing ring 427 and the elastic element 424.

The abutment 425 of the connection element 421 in the form of the screw nut is firmly mounted in the grip housing 44 of the cutting device 10. Thanks to a hexagonal form-fitting element 428, it is mounted firm against twisting. A cover 429, which is connected to the grip housing 44, secures the screw nut axially, so that it is positioned on the cutting device 10 even when the connection element 421 is removed. Moreover, between grip housing 44 and lever 80 there is arranged a sliding element 440 in the form of a sliding ring or a sliding disk. The sliding disk is at least a fixation element 441 joined firm against rotation to the grip housing 44. Moreover, the sliding element 440 is also arranged between spacing element 423 and the abutment 425 configured as the screw nut. Thus, the abutment is axially secured between sliding element 440 and the cover 429 especially when the connection element 421 is removed. Moreover, the sliding element 440 decouples a potential rotary movement of the spacing element 423 from the abutment 425.

FIG. 2

The control device 422 can be secured, firm against twisting, at least indirectly at one or more places to the grip housing 44 and/or the stationary first cutting element 12, so that the relative movement of the lever 80 or the first cutting element 12 does not result in an unwanted loosening of the connection element 421. For this, for example, the sliding element, the abutment 425 and/or the spacing element 423 are mounted, firm against twisting, on the grip housing 44.

A thickness of the first cutting element 12 is advantageously 4 mm. A thickness of the second cutting element 14 at its thickest point is advantageously 3.5 mm. A thickness of the lever 80 is advantageously 3.5 mm.

Figure 14:
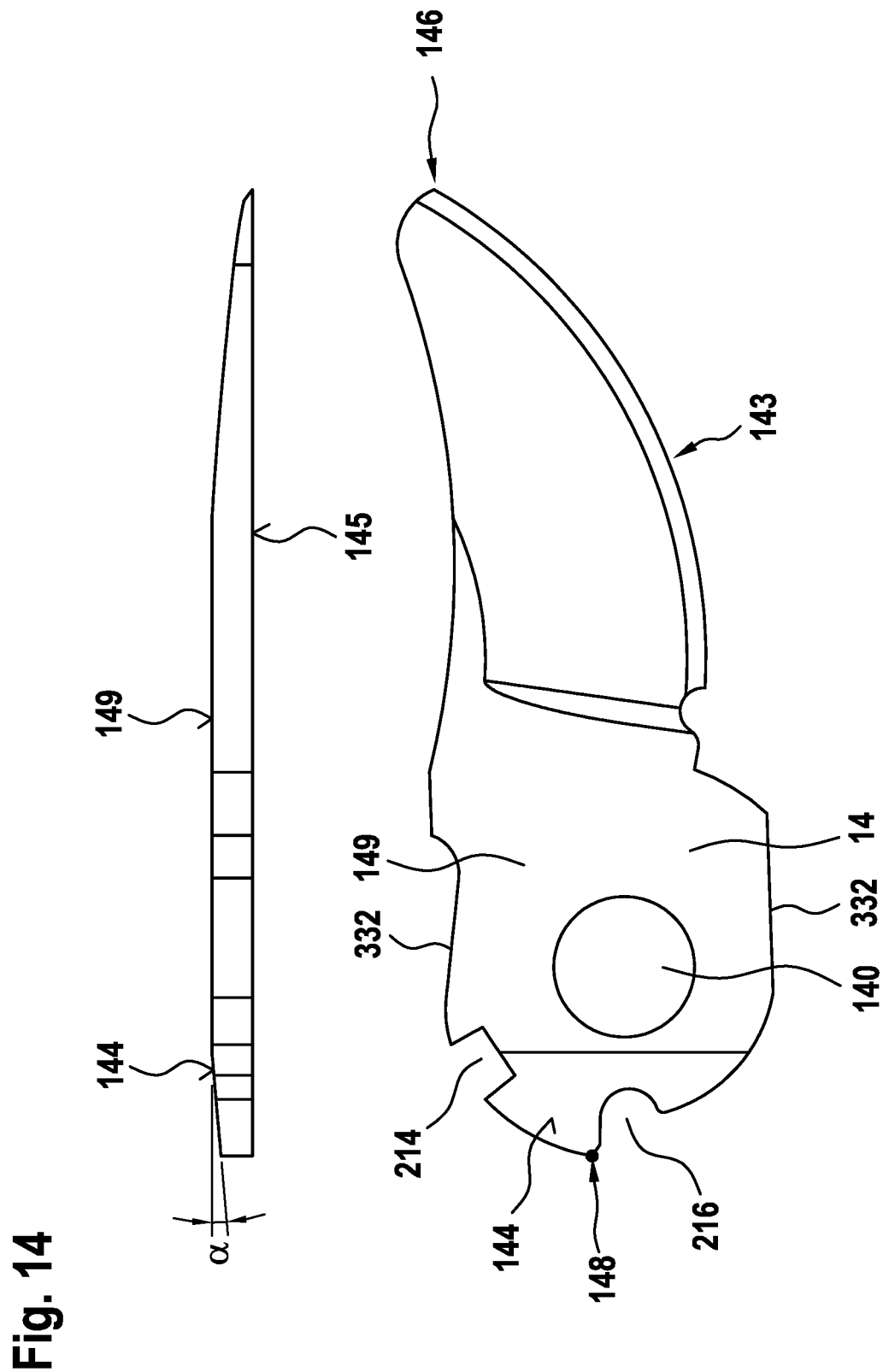
FIG. 14 shows a cutting element for the cutting device in a top view and a side view.
Figure 15:
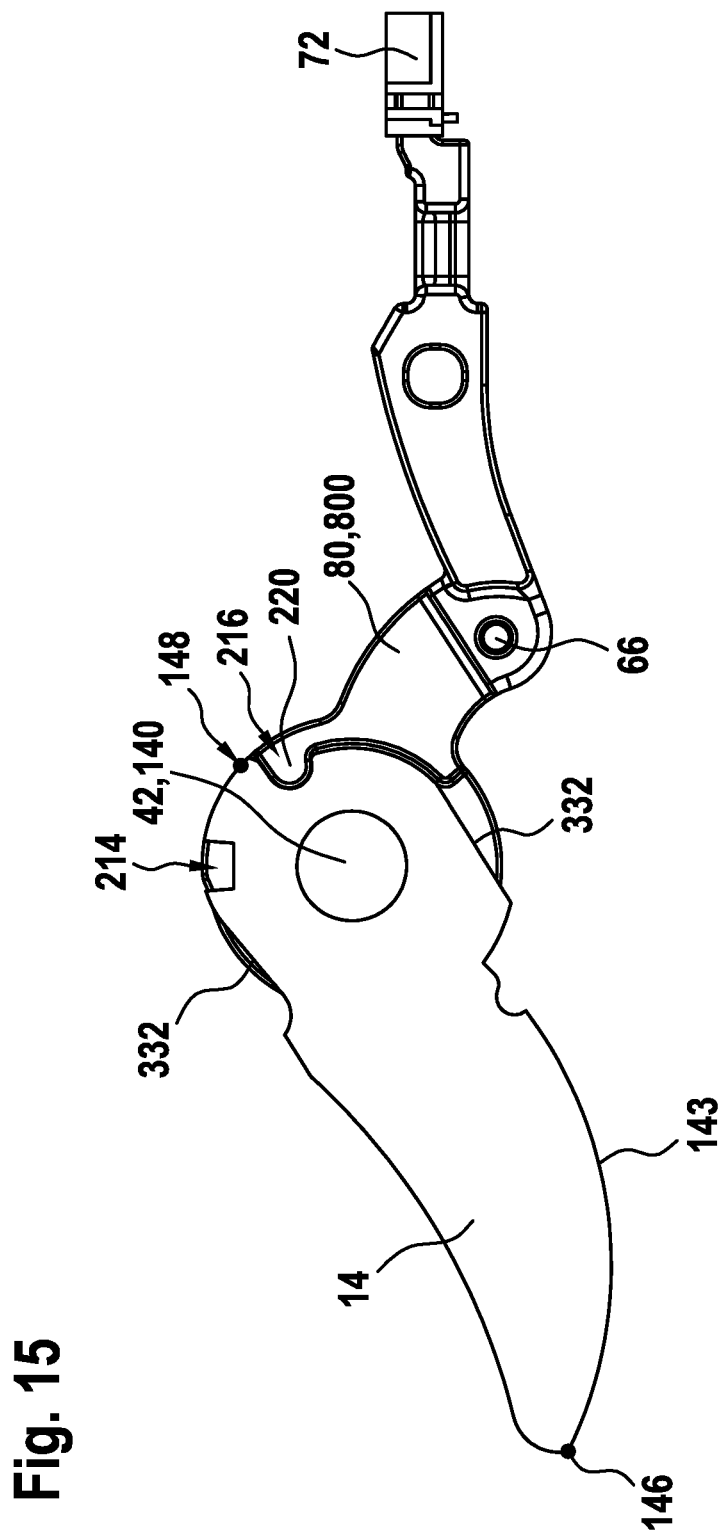
FIG. 15 shows a representation of the cutting element connected to a force transmission element.

FIG. 14 shows a cutting element, fashioned as the second cutting element 14, in a top view, as well as a side view. The second cutting element 14 has a blade 143. The second cutting element 14 is an interchangeable cutting element for the cutting device 10. The second cutting element 14 has a tip 146 and an end 148 opposite the tip 146. In the region of the end 148, the second cutting element 14 has a recess 214. The recess 214 serves as a mount for a locking element 210 of the blocking device 202 of the cutting device 10 for blocking a movement of the cutting elements 12, 14 toward each other. Moreover, the second cutting element 14 comprises the form-fitting element 216, which is designed as a counter locking recess for the locking lug 220 of the lever 80 of the cutting device 10. The form-fitting element 216 serves to transmit radial forces of the gripping element 18, especially via the lever 80, about the pivot 42 of the cutting device 10. The end 148 of the second cutting element 14 is moreover at least partly rounded. Between the end 148 of the second cutting element 14 and a mount 142, designed as a recess 140, which is designed for the rotary mounting of the second cutting element 14 in the cutting device 10, the second cutting element 14 has an insert guide 144 in the form of a slanting surface. The insert guide 144 is beveled with respect to a cutting plane of the second cutting element 14, formed by the cutting surface 145, but it can also be round, in particular convex. The insert guide 144 runs substantially from the center of the mount 142 in the radial direction as far as the end 148 of the second cutting element 14. A thickness of the second cutting element 14 decreases in the region of the insert guide 144 in the direction of the end 148. The thickness decreases from around 3.5 mm to 2.7 mm. A sector length of the slanting surface is advantageously 9 mm. The angle α of the slanting surface is advantageously less than 30°, especially less than 15° and most especially preferably around 5°. Between the insert guide 144 and the blade 143 extends a bearing surface 149. The bearing surface 149 is designed for the form-fitting connection to the lever 80. It is flat in configuration and oriented normal to the direction of the recess 142 or normal to the direction of an axis of rotation 420 of the pair of garden shears 10. The opposite cutting surface 145 is designed to slide along the first cutting element 12. It swivels, sliding along the first cutting element 12, about the axis of rotation 420 or the pivot 42.

Figure 10:
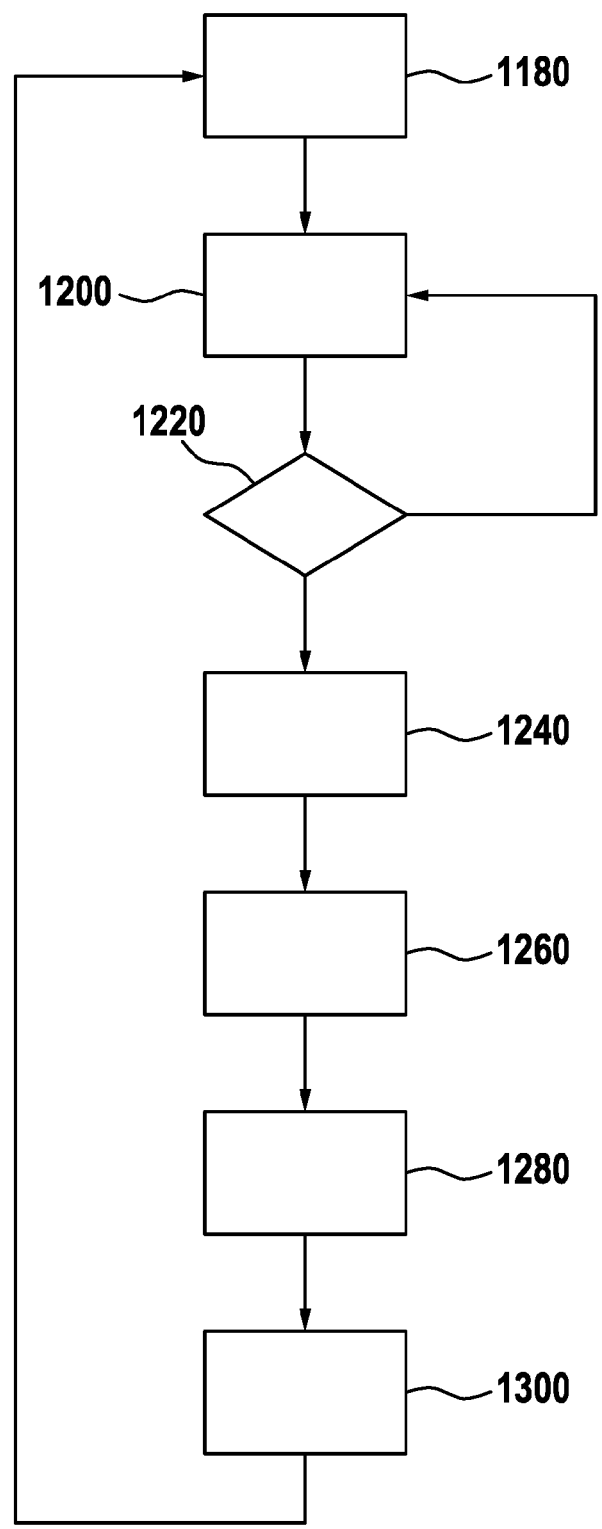
FIG. 10 shows a flow chart of a method for an operation of the cutting device.

A method for operating the cutting device 10 will be described below (FIG. 10).

Preferably an activation of the cutting device is only possible when the blocking device is in the second position. Preferably no charging process of the cutting device is provided in this second position. The cutting device 10 is constantly in an operating mode. As soon as the switch 72 is closed, the control unit 52 activates the drive motor 20. Basically, however, it would also be conceivable for the cutting device 10 to have in particular in addition an operating switch, by means of which the cutting device 10 can be activated and deactivated. Alternatively, it would also be conceivable for the cutting device 10 to activate itself, for example by a defined closing and/or opening sequence of the cutting device 10. A deactivation would be conceivable in dependence on the time, for example.

If a user would like to perform a cutting process during operation, such as cutting through a branch, he must position the material 11 to be cut between the cutting elements 12, 14 of the cutting device 10. Next, the cutting elements 12, 14 can be closed by pressing together the gripping elements 16, 18 relative to each other, especially as with a traditional pair of garden shears. The gripping elements 16, 18 in a step 1180 are manually pressed together by a user. As long as the spring force of the force sensor 40 is not exceeded, the switch 72 does not put out any signal. In step 1200, the control unit 52 monitors a signal of the force sensor 40 or switch 72. The control unit 52 thus monitors a force required for a cutting process. The control unit 52 checks whether the switch 72 of the force sensor 40 is open or closed.

If the force of a user $F_{user}$ which is required for the cutting process is less than a force as defined by the force sensor 40, which is needed for a closing of the switch 72, the cutting device 10 is used in a manual mode. If the switch 72 is opened, step 1200 is repeated in the following decision loop 1220. In manual mode, the gripping elements 16, 18 are manually swiveled toward each other by a user. In manual mode, the cable 34 is wound up on the cable winch 32 by means of the restoring unit 31 or the spring element 36. Since in this case a force from a power takeoff side is acting on the coupling unit 22, the coupling unit 22 is in an opened state. The cable winch 32 can therefore be turned without any resistance of the gear unit 38 and the driving element 20. The cable 34 in this state is held taut by the spring element 36. If a user reduces a force on the gripping elements 16, 18, for example because a cutting process is ended, the gripping elements 16, 18 are moved apart by means of the opening spring 50 and the cutting device 10 is opened. The cable 34 is unwound against the spring force of the spring element 36 from the cable winch 32.

If an energy storage unit 54 of the cutting device 10 is empty, the cutting device 10 can be used in a manual mode, in which case the driving element 20 remains deactivated even upon exceeding a force as defined by the force sensor 40. There is no activation of the driving element 20, so that the coupling unit 22 also remains opened.

If a force of a user $F_{user}$ required for the cutting process is greater than a force defined by the force sensor 40 which is needed for a closing of the switch 72, the cutting device 10 is used in an assisted mode. A switching from a manual mode to an assisted mode is done basically during a cutting process. In the manual mode, the gripping elements 16, 18 are swiveled manually against each other by a user. If a hard material 11 is being cut, the gripping elements 16, 18 must be pressed together by a user with large force. If a force applied is so large that the switch 72 is closed upon overcoming a spring force $F_{gs}$, this will be sensed by the control unit 52. The control unit 52 thereupon activates the driving element 20. If it is determined in the decision loop 1220 that the switch 72 has been closed, the driving element 20 is activated via the control unit 52 in a step 1240. The driving element 20 accordingly is switched on for a closing mechanism of the cutting device 10 upon exceeding a defined user force. The driving element 20 thereupon drives the inner rotary element 46 of the coupling unit 22 via the gear unit 38. The driving element 20 is driven in the driving direction 41. The coupling unit 22 is closed and drives the cable winch 32. The cable 34 is wound up on the cable winch 32. The gripping elements 16, 18 are now pushed or drawn together by a driving force $F_{as}$ in addition to a user force $F_{user}$. The driving element 20 in this operating state applies an additional force to the cutting elements 12, 14, during a partly manual movement. The driving force $F_{as}$, in this case acts on the cable 34 via the cable winch 32.

The driving force $F_{as}$ in this case acts via the cable 34 on the lever 80. As long as the operating force $F_{user}$ continues to be greater than a force as defined by the force sensor 40, which is required for a closing of the switch 72, the manual movement continues to be assisted by the driving force $F_{an}$. On the other hand, if the operating force $F_{user}$ is relaxed such that the switch 72 opens, the driving element 20 halts in a step 1260. A halting of the driving element 20 in step 1260 can also be achieved if the two gripping elements 16, 18 are closed or touch via the spacing element 630 or an object 17 is present between the gripping elements 16, 18, so that likewise a force as defined by the force sensor 40 and needed for a closing of the switch 72 is undershot. The operating force $F_{user}$ in this state can no longer act on the force sensor 40, since the driving force $F_{as}$ acts on the lever 80 via the cable 34 and moves it to its starting position in which the switch 72 is opened. The driving element 20 is then driven in a step 1280 briefly in the counter-driving direction 410 in order to open the coupling unit 22. The brake element 28 brakes the cage 26, the clamping bodies 24 no longer clamp the outer against the inner rotary element 46, 48. This reversal of direction of the driving element 20 or the drive of the driving element 20 in the counter-driving direction 410 can be brief, for example less than 100 milliseconds, especially 40 milliseconds. Then the driving element 20 is deactivated in a step 1300. After a deactivation of the driving element 20, the process can begin from the start.

Basically the coupling unit 22 can also automatically decouple the driving element 20 in absence of a rotary movement. The cutting device 10, when a rotary movement of the driving element 20 is halted, can also in theory be at least partly opened by the opening spring 50 and the cable winch 32 turned via the cable 34 partly against a driving direction 41 of the driving element 20. Likewise, a rotation of the inner rotary element 46 toward the outer rotary element 48 of the coupling unit 22 can also take place, and the coupling unit 22 opened in this way. Basically, however, some other method of opening the coupling unit 22 would also be conceivable.

The invention claimed is:

1. A cutting device, comprising:
   a first cutting element and a second cutting element configured to move relative to each other;
   a first gripping element and a second gripping element configured to move relative to each other;
   at least one driving element configured to assist a movement of the second cutting element relative to the first cutting element in at least one operating state in which the at least one driving element is activated; and
   at least one self-switching coupling unit configured to decouple the at least one driving element in at least one operating state in which the at least one driving element is deactivated,
   wherein the at least one self-switching coupling unit is configured as a freewheel clutch.

2. The cutting device of claim 1, further comprising:
   a spring element configured as a brake element for switching the at least one self-switching coupling unit.

3. The cutting device according to claim 1, wherein the at least one self-switching coupling unit comprises at least one clamping body.

4. The cutting device according to claim 3, wherein the at least one self-switching coupling unit comprises at least one cage accommodating the at least one clamping body and the brake element, which is configured for a braking of the cage in the at least one operating state in which the at least one driving element is deactivated.

5. The cutting device according to claim 1, wherein the at least one self-switching coupling unit is configured, in the at least one operating state in which the at least one driving element is deactivated, to decouple the at least one driving element to realize a full manual operation.

6. The cutting device of claim 1, further comprising:
   a force sensor including a spring element, the force sensor configured to detect a relative movement between a driving force transmission element and the second gripping element in order to recognize an object located between the first gripping element and the second gripping element.

7. The cutting device according to claim 6, wherein the driving force transmission element is arranged between the second cutting element and the second gripping element, and is connected firm against rotation to the second cutting element, the driving force transmission element standing in operative connection with the at least one driving element and configured to determine a movement assistance, for determining a switching of a movement assistance mode on and off, the driving force transmission element movable relative to the second gripping element.

8. The cutting device according to claim 7, further comprising:
   a sensor configured to detect the relative movement between the driving force transmission element and the second gripping element, the sensor comprising a spring, a switch, and an assistance mode adjustment element arranged on a grip and inside of the first gripping element or the second gripping element.

9. The cutting device of claim 1, further comprising:
   a spring element including an opening spring located between the first and the second gripping elements; and
   at least one driving force transmission element located inside the opening spring, the at least one driving force transmission element standing in operative connection with the at least one driving element in the at least one operating state in which the at least one driving element is activated.

10. The cutting device according to claim 9, wherein the driving force transmission element is a cable of polyethylene or polyethylene with ultrahigh molar mass.

11. The cutting device according to claim 9, wherein the driving force transmission element is arranged without contact inside the opening spring.

12. The cutting device according to claim 9, wherein the opening spring is an evolute spring or a double evolute spring.

13. The cutting device according to claim 9, further comprising:
    a protection device located between a pivot connecting the first gripping element and the second gripping element and the opening spring, the protection device further located between the first gripping element and the second gripping element.

14. The cutting device according to claim 13, wherein the protection device receives a cable of the cutting device and/or forms a blocking device configured to partially block an intermediate space which is bounded by the first gripping element and the second gripping element, the pivot, and the opening spring in order to avoid at least an accidental catching of part of a user's body in the intermediate space.

15. The cutting device according to claim 1, further comprising:
    a cable winch operably connected to the at least one driving element; and
    a cable operably connected to the cable winch and extending from the first gripping element to the second gripping element.

16. The cutting device according to claim 15, wherein the at least one self-switching coupling unit is at least partly integrated in the cable winch.

17. The cutting device according to claim 15, further comprising:
    a spring element connected to the cable winch and configured to tension the cable.

18. The cutting device according to claim 1, further comprising:
    a gear unit operably connected to the at least one driving element and located in one of the first gripping element and the second gripping element.

19. The cutting device according to claim 18, wherein the at least one driving element and the gear unit are located between the first and the second cutting elements and the at least one self-switching coupling unit.

20. The cutting device according to claim 18, wherein:
    the gear unit includes at least two gear stages, and the at least one self-switching coupling unit is located between gear stages of the at least two gear stages.

* * * * *